US012528298B2

(12) United States Patent
Uetsuki et al.

(10) Patent No.: US 12,528,298 B2
(45) Date of Patent: Jan. 20, 2026

(54) PRINTING APPARATUS, CONTROL METHOD, AND STORAGE MEDIUM

(71) Applicant: CANON KABUSHIKI KAISHA, Tokyo (JP)

(72) Inventors: Masaya Uetsuki, Kanagawa (JP); Yosuke Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 18/533,837

(22) Filed: Dec. 8, 2023

(65) Prior Publication Data

US 2024/0198691 A1 Jun. 20, 2024

(30) Foreign Application Priority Data

Dec. 20, 2022 (JP) ................................ 2022-203719

(51) Int. Cl.
*B41J 2/195* (2006.01)
*B41J 2/205* (2006.01)
*B41J 29/393* (2006.01)

(52) U.S. Cl.
CPC ............. *B41J 2/195* (2013.01); *B41J 2/2056* (2013.01); *B41J 29/393* (2013.01); *B41J 2029/3935* (2013.01)

(58) Field of Classification Search
CPC ........ B41J 2/195; B41J 2/2056; B41J 29/393; B41J 2029/3935; B41J 2/2107; B41J 2/2114; C09D 11/322
USPC ........................................................ 347/100
See application file for complete search history.

(56) References Cited

U.S. PATENT DOCUMENTS

| | | | |
|---|---|---|---|
| 8,632,147 | B2 | 1/2014 | Onishi |
| 8,733,874 | B2 | 5/2014 | Baba |
| 9,108,409 | B2 | 8/2015 | Suzuki |
| 9,114,607 | B2 | 8/2015 | Ishii |

(Continued)

FOREIGN PATENT DOCUMENTS

| | | |
|---|---|---|
| JP | 2011-025685 A | 2/2011 |
| JP | 2011-189627 A | 9/2011 |
| JP | 2016-020039 A | 2/2016 |

OTHER PUBLICATIONS

"Paper and Board—Determination of the Liquid Absorbability—Bristow's Method," Japan Tappi Paper Pulp Test Method No. 51, Japan Tappi Paper and Pulp Test Methods, 2000, pp. 51/1-51/6.

*Primary Examiner* — Jason S Uhlenhake
*Assistant Examiner* — Alexander D Shenderov
(74) *Attorney, Agent, or Firm* — Venable LLP

(57) ABSTRACT

A printing apparatus includes: a printing unit configured to eject a color material ink and a reaction liquid; a controller configured to control the printing unit such that the printing unit prints a first test pattern in which a plurality of patches are arranged; a first obtaining unit configured to obtain an optical density for each of the plurality of patches; a second obtaining unit configured to obtain a specular reflection intensity for each of the plurality of patches; and a first generation unit configured to generate correction information based on the optical density obtained by the first obtaining unit, the specular reflection intensity obtained by the second obtaining unit, a first target value of the optical density for a first input value of the color material ink, and a second target value of the specular reflection intensity for a second input value of the reaction liquid.

25 Claims, 31 Drawing Sheets

(56) References Cited

U.S. PATENT DOCUMENTS

| | | | | |
|---|---|---|---|---|
| 2007/0064026 | A1* | 3/2007 | Hirakawa | B41J 2/2114<br>347/6 |
| 2010/0321434 | A1 | 12/2010 | Baba | |
| 2011/0221808 | A1 | 9/2011 | Onishi | |
| 2016/0347051 | A1* | 12/2016 | Narumi | B41J 2/2142 |
| 2020/0247163 | A1* | 8/2020 | Baba | B41J 29/393 |
| 2023/0142347 | A1 | 5/2023 | Yoshizawa | |

* cited by examiner

K →

Rct ↓

| PATCH No. | INPUT | PRINTING DENSITY | X01 | X02 | X03 | X04 | X05 | X06 | X07 | X08 | X09 | X10 |
|---|---|---|---|---|---|---|---|---|---|---|---|---|
| | | | 0.1 | 0.2 | 0.3 | 0.4 | 0.5 | 0.6 | 0.7 | 0.8 | 0.9 | 1 |
| | | | 20% | 40% | 60% | 80% | 100% | 120% | 140% | 160% | 180% | 200% |
| Y01 | 0.02 | 4% | X01Y01 | X02Y01 | X03Y01 | X04Y01 | X05Y01 | X06Y01 | X07Y01 | X08Y01 | X09Y01 | X10Y01 |
| Y02 | 0.04 | 8% | X01Y02 | X02Y02 | X03Y02 | X04Y02 | X05Y02 | X06Y02 | X07Y02 | X08Y02 | X09Y02 | X10Y02 |
| Y03 | 0.06 | 12% | X01Y03 | X02Y03 | X03Y03 | X04Y03 | X05Y03 | X06Y03 | X07Y03 | X08Y03 | X09Y03 | X10Y03 |
| Y04 | 0.08 | 16% | X01Y04 | X02Y04 | X03Y04 | X04Y04 | X05Y04 | X06Y04 | X07Y04 | X08Y04 | X09Y04 | X10Y04 |
| Y05 | 0.10 | 20% | X01Y05 | X02Y05 | X03Y05 | X04Y05 | X05Y05 | X06Y05 | X07Y05 | X08Y05 | X09Y05 | X10Y05 |
| Y06 | 0.12 | 24% | X01Y06 | X02Y06 | X03Y06 | X04Y06 | X05Y06 | X06Y06 | X07Y06 | X08Y06 | X09Y06 | X10Y06 |
| Y07 | 0.14 | 28% | X01Y07 | X02Y07 | X03Y07 | X04Y07 | X05Y07 | X06Y07 | X07Y07 | X08Y07 | X09Y07 | X10Y07 |
| Y08 | 0.16 | 32% | X01Y08 | X02Y08 | X03Y08 | X04Y08 | X05Y08 | X06Y08 | X07Y08 | X08Y08 | X09Y08 | X10Y08 |
| Y09 | 0.18 | 36% | X01Y09 | X02Y09 | X03Y09 | X04Y09 | X05Y09 | X06Y09 | X07Y09 | X08Y09 | X09Y09 | X10Y09 |
| Y10 | 0.20 | 40% | X01Y10 | X02Y10 | X03Y10 | X04Y10 | X05Y10 | X06Y10 | X07Y10 | X08Y10 | X09Y10 | X10Y10 |
| Y11 | 0.22 | 44% | X01Y11 | X02Y11 | X03Y11 | X04Y11 | X05Y11 | X06Y11 | X07Y11 | X08Y11 | X09Y11 | X10Y11 |
| Y12 | 0.24 | 48% | X01Y12 | X02Y12 | X03Y12 | X04Y12 | X05Y12 | X06Y12 | X07Y12 | X08Y12 | X09Y12 | X10Y12 |
| Y13 | 0.26 | 52% | X01Y13 | X02Y13 | X03Y13 | X04Y13 | X05Y13 | X06Y13 | X07Y13 | X08Y13 | X09Y13 | X10Y13 |
| Y14 | 0.28 | 56% | X01Y14 | X02Y14 | X03Y14 | X04Y14 | X05Y14 | X06Y14 | X07Y14 | X08Y14 | X09Y14 | X10Y14 |
| Y15 | 0.30 | 60% | X01Y15 | X02Y15 | X03Y15 | X04Y15 | X05Y15 | X06Y15 | X07Y15 | X08Y15 | X09Y15 | X10Y15 |
| Y16 | 0.32 | 64% | X01Y16 | X02Y16 | X03Y16 | X04Y16 | X05Y16 | X06Y16 | X07Y16 | X08Y16 | X09Y16 | X10Y16 |
| Y17 | 0.34 | 68% | X01Y17 | X02Y17 | X03Y17 | X04Y17 | X05Y17 | X06Y17 | X07Y17 | X08Y17 | X09Y17 | X10Y17 |
| Y18 | 0.36 | 72% | X01Y18 | X02Y18 | X03Y18 | X04Y18 | X05Y18 | X06Y18 | X07Y18 | X08Y18 | X09Y18 | X10Y18 |
| Y19 | 0.38 | 76% | X01Y19 | X02Y19 | X03Y19 | X04Y19 | X05Y19 | X06Y19 | X07Y19 | X08Y19 | X09Y19 | X10Y19 |
| Y20 | 0.40 | 80% | X01Y20 | X02Y20 | X03Y20 | X04Y20 | X05Y20 | X06Y20 | X07Y20 | X08Y20 | X09Y20 | X10Y20 |

FIG.8

PRINTING RESULT OF TEST PATTERN

TARGETS (TARGET VALUES) AND OPTICAL DENSITY MEASUREMENT RESULT OF EACH PATCH

| | | | | | | | | | | |
|---|---|---|---|---|---|---|---|---|---|---|
| K INPUT | 0.1 | 0.2 | 0.3 | 0.4 | 0.5 | 0.6 | 0.7 | 0.8 | 0.9 | 1 |
| TARGET | 0.5 | 0.9 | 1.2 | 1.4 | 1.57 | 1.7 | 1.8 | 1.9 | 1.95 | 2 |

| | X01 | X02 | X03 | X04 | X05 | X06 | X07 | X08 | X09 | X10 |
|---|---|---|---|---|---|---|---|---|---|---|
| Y01 | 0.50 | 0.92 | 1.48 | 1.69 | 1.88 | 2.00 | 2.17 | 2.25 | 2.39 | 2.62 |
| Y02 | 0.49 | 0.90 | 1.45 | 1.66 | 1.84 | 1.96 | 2.13 | 2.20 | 2.33 | 2.56 |
| Y03 | 0.48 | 0.89 | 1.43 | 1.63 | 1.81 | 1.92 | 2.08 | 2.15 | 2.28 | 2.50 |
| Y04 | 0.47 | 0.87 | 1.40 | 1.60 | 1.77 | 1.88 | 2.04 | 2.10 | 2.22 | 2.44 |
| Y05 | 0.46 | 0.86 | 1.38 | 1.57 | 1.74 | 1.84 | 1.99 | 2.05 | 2.17 | 2.38 |
| Y06 | 0.45 | 0.84 | 1.35 | 1.54 | 1.70 | 1.80 | 1.95 | 2.00 | 2.11 | 2.32 |
| Y07 | 0.44 | 0.83 | 1.33 | 1.51 | 1.67 | 1.76 | 1.90 | 1.95 | 2.06 | 2.26 |
| Y08 | 0.43 | 0.81 | 1.30 | 1.48 | 1.63 | 1.72 | 1.86 | 1.90 | 2.00 | 2.20 |
| Y09 | 0.42 | 0.80 | 1.28 | 1.45 | 1.60 | 1.68 | 1.81 | 1.85 | 1.95 | 2.14 |
| Y10 | 0.41 | 0.78 | 1.25 | 1.42 | 1.56 | 1.64 | 1.77 | 1.80 | 1.89 | 2.08 |
| Y11 | 0.40 | 0.77 | 1.23 | 1.39 | 1.53 | 1.60 | 1.72 | 1.75 | 1.84 | 2.02 |
| Y12 | 0.39 | 0.75 | 1.20 | 1.36 | 1.49 | 1.56 | 1.68 | 1.70 | 1.78 | 1.96 |
| Y13 | 0.38 | 0.74 | 1.18 | 1.33 | 1.46 | 1.52 | 1.63 | 1.65 | 1.73 | 1.90 |
| Y14 | 0.37 | 0.72 | 1.15 | 1.30 | 1.42 | 1.48 | 1.59 | 1.60 | 1.67 | 1.84 |
| Y15 | 0.36 | 0.71 | 1.13 | 1.27 | 1.39 | 1.44 | 1.54 | 1.55 | 1.62 | 1.78 |
| Y16 | 0.35 | 0.69 | 1.10 | 1.24 | 1.35 | 1.40 | 1.50 | 1.50 | 1.56 | 1.72 |
| Y17 | 0.34 | 0.68 | 1.08 | 1.21 | 1.32 | 1.36 | 1.45 | 1.45 | 1.51 | 1.66 |
| Y18 | 0.33 | 0.66 | 1.05 | 1.18 | 1.28 | 1.32 | 1.41 | 1.40 | 1.45 | 1.60 |
| Y19 | 0.32 | 0.65 | 1.03 | 1.15 | 1.25 | 1.28 | 1.36 | 1.39 | 1.40 | 1.50 |
| Y20 | 0.31 | 0.63 | 1.00 | 1.12 | 1.21 | 1.28 | 1.36 | 1.38 | 1.40 | 1.50 |

FIG.10B

TARGETS (TARGET VALUES) AND SPECULAR REFLECTION INTENSITY MEASUREMENT RESULT OF EACH PATCH

| K INPUT | 0.1 | 0.2 | 0.3 | 0.4 | 0.5 | 0.6 | 0.7 | 0.8 | 0.9 | 1 |
|---|---|---|---|---|---|---|---|---|---|---|
| TARGET | 4.2 | 3.2 | 2.6 | 2.19 | 1.9 | 1.66 | 1.6 | 1.65 | 1.8 | 2.2 |

| | X01 | X02 | X03 | X04 | X05 | X06 | X07 | X08 | X09 | X10 |
|---|---|---|---|---|---|---|---|---|---|---|
| Y01 | 4.20 | 3.22 | 2.29 | 2.06 | 1.91 | 1.93 | 2.19 | 2.58 | 3.39 | 3.73 |
| Y02 | 4.00 | 3.20 | 2.25 | 2.02 | 1.86 | 1.86 | 2.10 | 2.45 | 3.22 | 3.54 |
| Y03 | 3.99 | 3.14 | 2.22 | 1.98 | 1.81 | 1.80 | 2.01 | 2.32 | 3.05 | 3.36 |
| Y04 | 3.98 | 3.12 | 2.19 | 1.94 | 1.76 | 1.73 | 1.92 | 2.19 | 2.88 | 3.17 |
| Y05 | 3.97 | 3.10 | 2.18 | 1.90 | 1.71 | 1.67 | 1.83 | 2.06 | 2.71 | 2.98 |
| Y06 | 3.96 | 3.08 | 2.15 | 1.87 | 1.66 | 1.60 | 1.74 | 1.93 | 2.54 | 2.79 |
| Y07 | 3.95 | 3.06 | 2.12 | 1.83 | 1.64 | 1.58 | 1.65 | 1.80 | 2.37 | 2.61 |
| Y08 | 3.94 | 3.04 | 2.08 | 1.79 | 1.59 | 1.52 | 1.61 | 1.70 | 2.20 | 2.42 |
| Y09 | 3.93 | 3.02 | 2.05 | 1.75 | 1.54 | 1.45 | 1.52 | 1.57 | 1.95 | 2.15 |
| Y10 | 3.92 | 3.00 | 2.02 | 1.71 | 1.49 | 1.39 | 1.43 | 1.44 | 1.70 | 1.87 |
| Y11 | 3.91 | 2.98 | 1.99 | 1.67 | 1.44 | 1.32 | 1.34 | 1.31 | 1.45 | 1.60 |
| Y12 | 3.90 | 2.96 | 1.96 | 1.63 | 1.39 | 1.26 | 1.25 | 1.18 | 1.23 | 1.35 |
| Y13 | 3.89 | 2.94 | 1.92 | 1.59 | 1.34 | 1.19 | 1.16 | 1.05 | 1.05 | 1.16 |
| Y14 | 3.88 | 2.92 | 1.89 | 1.55 | 1.29 | 1.13 | 1.07 | 0.92 | 0.88 | 0.97 |
| Y15 | 3.87 | 2.90 | 1.86 | 1.51 | 1.25 | 1.06 | 0.98 | 0.79 | 0.71 | 0.78 |
| Y16 | 3.86 | 2.88 | 1.83 | 1.46 | 1.20 | 1.00 | 0.89 | 0.66 | 0.54 | 0.59 |
| Y17 | 3.85 | 2.86 | 1.80 | 1.42 | 1.15 | 0.93 | 0.80 | 0.53 | 0.37 | 0.41 |
| Y18 | 3.84 | 2.84 | 1.76 | 1.38 | 1.10 | 0.87 | 0.71 | 0.40 | 0.20 | 0.22 |
| Y19 | 3.83 | 2.82 | 1.73 | 1.34 | 1.05 | 0.80 | 0.62 | 0.30 | 0.20 | 0.20 |
| Y20 | 3.82 | 2.80 | 1.70 | 1.20 | 1.00 | 0.80 | 0.60 | 0.30 | 0.20 | 0.20 |

FIG.10C

| INPUT X | THRESHOLD OF DIFFERENCE BETWEEN MEASUREMENT VALUE AND TARGET | |
|---|---|---|
| | OPTICAL DENSITY | SPECULAR REFLECTION INTENSITY |
| $0.1 \leqq X < 0.5$ | 0.010 | 0.05% |
| $0.5 \leqq X < 0.7$ | 0.025 | 0.10% |
| $0.7 \leqq X \leqq 1.0$ | 0.050 | 0.20% |

FIG.11B

TARGET

| | | | | | | | | | | |
|---|---|---|---|---|---|---|---|---|---|---|
| K INPUT X | 0.1 | 0.2 | 0.3 | 0.4 | 0.5 | 0.6 | 0.7 | 0.8 | 0.9 | 1 |
| REACTION LIQUID INPUT Y | 0.02 | 0.04 | 0.06 | 0.08 | 0.1 | 0.12 | 0.14 | 0.16 | 0.18 | 0.2 |
| OPTICAL DENSITY TARGET | 0.5 | 0.9 | 1.2 | 1.4 | 1.57 | 1.7 | 1.8 | 1.9 | 1.95 | 2 |
| REFLECTANCE TARGET | 4.2 | 3.2 | 2.6 | 2.19 | 1.9 | 1.66 | 1.6 | 1.65 | 1.8 | 2.2 |

FIG.12A

DIFFERENCE FROM OPTICAL DENSITY TARGET≤0.025… S1102

| PATCH No. | | X01 | X02 | X03 | X04 | X05 | X06 | X07 | X08 | X09 | X10 |
|---|---|---|---|---|---|---|---|---|---|---|---|
| | INPUT | 0.1 | 0.2 | 0.3 | 0.4 | 0.5 | 0.6 | 0.7 | 0.8 | 0.9 | 1 |
| Y01 | 0.02 | 0 | 0 | 0 | 1 | 0 | 0 | 0 | 0 | 0 | 0 |
| Y02 | 0.04 | 0 | 0 | 0 | 0 | 0 | 0 | 0 | 0 | 0 | 0 |
| Y03 | 0.06 | 0 | 0 | 0 | 0 | 0 | 0 | 0 | 0 | 0 | 0 |
| Y04 | 0.08 | 0 | 0 | 0 | 0 | 0 | 0 | 0 | 0 | 0 | 0 |
| Y05 | 0.10 | 0 | 0 | 0 | 0 | 0 | 0 | 0 | 0 | 0 | 0 |
| Y06 | 0.12 | 0 | 0 | 0 | 0 | 1 | 0 | 0 | 0 | 0 | 0 |
| Y07 | 0.14 | 0 | 0 | 0 | 0 | 0 | 0 | 0 | 0 | 0 | 0 |
| Y08 | 0.16 | 0 | 0 | 0 | 0 | 0 | 1 | 0 | 0 | 0 | 0 |
| Y09 | 0.18 | 0 | 0 | 0 | 0 | 0 | 1 | 0 | 0 | 0 | 0 |
| Y10 | 0.20 | 0 | 0 | 0 | 0 | 0 | 0 | 0 | 0 | 0 | 0 |
| Y11 | 0.22 | 0 | 0 | 0 | 0 | 0 | 0 | 1 | 0 | 0 | 0 |
| Y12 | 0.24 | 0 | 0 | 0 | 0 | 0 | 0 | 1 | 1 | 0 | 0 |
| Y13 | 0.26 | 0 | 0 | 0 | 0 | 0 | 0 | 0 | 0 | 0 | 0 |
| Y14 | 0.28 | 0 | 0 | 0 | 0 | 0 | 0 | 0 | 0 | 0 | 0 |
| Y15 | 0.30 | 0 | 0 | 0 | 0 | 0 | 0 | 0 | 0 | 0 | 0 |
| Y16 | 0.32 | 0 | 0 | 0 | 0 | 0 | 0 | 0 | 0 | 0 | 1 |
| Y17 | 0.34 | 0 | 0 | 0 | 0 | 0 | 0 | 0 | 0 | 0 | 0 |
| Y18 | 0.36 | 0 | 0 | 0 | 0 | 0 | 0 | 0 | 0 | 0 | 0 |
| Y19 | 0.38 | 0 | 0 | 0 | 0 | 0 | 0 | 0 | 0 | 0 | 0 |
| Y20 | 0.40 | 0 | 0 | 0 | 0 | 0 | 0 | 0 | 0 | 0 | 0 |

FIG.12B

DIFFERENCE FROM SPECULAR REFLECTION INTENSITY TARGET ≤ 0.1% ... S1103

| PATCH No. | INPUT | X01 | X02 | X03 | X04 | X05 | X06 | X07 | X08 | X09 | X10 |
|---|---|---|---|---|---|---|---|---|---|---|---|
| | | 0.1 | 0.2 | 0.3 | 0.4 | 0.5 | 0.6 | 0.7 | 0.8 | 0.9 | 1 |
| Y01 | 0.02 | 0 | 0 | 0 | 0 | 0 | 0 | 0 | 0 | 0 | 0 |
| Y02 | 0.04 | 0 | 0 | 0 | 0 | 0 | 0 | 0 | 0 | 0 | 0 |
| Y03 | 0.06 | 0 | 0 | 0 | 0 | 0 | 0 | 0 | 0 | 0 | 0 |
| Y04 | 0.08 | 0 | 0 | 0 | 0 | 1 | 1 | 0 | 0 | 0 | 0 |
| Y05 | 0.10 | 0 | 0 | 0 | 0 | 1 | 1 | 0 | 0 | 0 | 0 |
| Y06 | 0.12 | 0 | 0 | 0 | 0 | 1 | 1 | 1 | 0 | 0 | 0 |
| Y07 | 0.14 | 0 | 0 | 0 | 0 | 1 | 1 | 1 | 0 | 0 | 0 |
| Y08 | 0.16 | 0 | 0 | 0 | 0 | 1 | 0 | 1 | 1 | 0 | 0 |
| Y09 | 0.18 | 0 | 0 | 0 | 1 | 0 | 0 | 0 | 1 | 0 | 0 |
| Y10 | 0.20 | 0 | 0 | 0 | 1 | 0 | 0 | 0 | 0 | 1 | 0 |
| Y11 | 0.22 | 0 | 0 | 0 | 1 | 0 | 0 | 0 | 0 | 0 | 1 |
| Y12 | 0.24 | 0 | 0 | 0 | 1 | 0 | 0 | 0 | 0 | 0 | 0 |
| Y13 | 0.26 | 0 | 0 | 0 | 1 | 0 | 0 | 0 | 0 | 0 | 0 |
| Y14 | 0.28 | 0 | 0 | 0 | 0 | 0 | 0 | 0 | 0 | 0 | 0 |
| Y15 | 0.30 | 0 | 0 | 0 | 0 | 0 | 0 | 0 | 0 | 0 | 0 |
| Y16 | 0.32 | 0 | 0 | 0 | 0 | 0 | 0 | 0 | 0 | 0 | 0 |
| Y17 | 0.34 | 0 | 0 | 0 | 0 | 0 | 0 | 0 | 0 | 0 | 0 |
| Y18 | 0.36 | 0 | 0 | 0 | 0 | 0 | 0 | 0 | 0 | 0 | 0 |
| Y19 | 0.38 | 0 | 0 | 1 | 0 | 0 | 0 | 0 | 0 | 0 | 0 |
| Y20 | 0.40 | 0 | 0 | 1 | 0 | 0 | 0 | 0 | 0 | 0 | 0 |

FIG.12C

OPTICAL DENSITY DIFFERENCE IS EQUAL TO OR SMALLER THAN THRESHOLD AND SPECULAR REFLECTION INTENSITY DIFFERENCE IS EQUAL TO OR SMALLER THAN THRESHOLD
= CLOSE TO TARGETS → CORRECTION VALUES (X', Y') = (0.5, 0.12) …
NUMBER IN CELL IS R(6) = X'/Y'= 4.2 … S1105

| PATCH No. | | X01 | X02 | X03 | X04 | X05 | X06 | X07 | X08 | X09 | X10 |
|---|---|---|---|---|---|---|---|---|---|---|---|
| | INPUT | 0.1 | 0.2 | 0.3 | 0.4 | 0.5 | 0.6 | 0.7 | 0.8 | 0.9 | 1 |
| Y01 | 0.02 | 0 | 0 | 0 | 0 | 0 | 0 | 0 | 0 | 0 | 0 |
| Y02 | 0.04 | 0 | 0 | 0 | 0 | 0 | 0 | 0 | 0 | 0 | 0 |
| Y03 | 0.06 | 0 | 0 | 0 | 0 | 0 | 0 | 0 | 0 | 0 | 0 |
| Y04 | 0.08 | 0 | 0 | 0 | 0 | 0 | 0 | 0 | 0 | 0 | 0 |
| Y05 | 0.10 | 0 | 0 | 0 | 0 | 0 | 0 | 0 | 0 | 0 | 0 |
| Y06 | 0.12 | 0 | 0 | 0 | 0 | 4.2 | 0 | 0 | 0 | 0 | 0 |
| Y07 | 0.14 | 0 | 0 | 0 | 0 | 0 | 0 | 0 | 0 | 0 | 0 |
| Y08 | 0.16 | 0 | 0 | 0 | 0 | 0 | 0 | 0 | 0 | 0 | 0 |
| Y09 | 0.18 | 0 | 0 | 0 | 0 | 0 | 0 | 0 | 0 | 0 | 0 |
| Y10 | 0.20 | 0 | 0 | 0 | 0 | 0 | 0 | 0 | 0 | 0 | 0 |
| Y11 | 0.22 | 0 | 0 | 0 | 0 | 0 | 0 | 0 | 0 | 0 | 0 |
| Y12 | 0.24 | 0 | 0 | 0 | 0 | 0 | 0 | 0 | 0 | 0 | 0 |
| Y13 | 0.26 | 0 | 0 | 0 | 0 | 0 | 0 | 0 | 0 | 0 | 0 |
| Y14 | 0.28 | 0 | 0 | 0 | 0 | 0 | 0 | 0 | 0 | 0 | 0 |
| Y15 | 0.30 | 0 | 0 | 0 | 0 | 0 | 0 | 0 | 0 | 0 | 0 |
| Y16 | 0.32 | 0 | 0 | 0 | 0 | 0 | 0 | 0 | 0 | 0 | 0 |
| Y17 | 0.34 | 0 | 0 | 0 | 0 | 0 | 0 | 0 | 0 | 0 | 0 |
| Y18 | 0.36 | 0 | 0 | 0 | 0 | 0 | 0 | 0 | 0 | 0 | 0 |
| Y19 | 0.38 | 0 | 0 | 0 | 0 | 0 | 0 | 0 | 0 | 0 | 0 |
| Y20 | 0.40 | 0 | 0 | 0 | 0 | 0 | 0 | 0 | 0 | 0 | 0 |

FIG.12D

TARGET

| | | | | | | | | | | |
|---|---|---|---|---|---|---|---|---|---|---|
| K INPUT X | 0.1 | 0.2 | 0.3 | 0.4 | 0.5 | 0.6 | 0.7 | 0.8 | 0.9 | 1 |
| REACTION LIQUID INPUT Y | 0.02 | 0.04 | 0.06 | 0.08 | 0.1 | 0.12 | 0.14 | 0.16 | 0.18 | 0.2 |
| OPTICAL DENSITY TARGET | 0.5 | 0.9 | 1.2 | 1.4 | 1.57 | 1.7 | 1.8 | 1.9 | 1.95 | 2 |
| REFLECTANCE TARGET | 4.2 | 3.2 | 2.6 | 2.19 | 1.9 | 1.66 | 1.6 | 1.65 | 1.8 | 2.2 |

FIG.13A

DIFFERENCE FROM SPECULAR REFLECTION INTENSITY TARGET ≤ 0.2 % ... S1102

| PATCH No. | | X01 | X02 | X03 | X04 | X05 | X06 | X07 | X08 | X09 | X10 |
|---|---|---|---|---|---|---|---|---|---|---|---|
| | INPUT | 0.1 | 0.2 | 0.3 | 0.4 | 0.5 | 0.6 | 0.7 | 0.8 | 0.9 | 1 |
| Y01 | 0.02 | 0 | 0 | 0 | 0 | 1 | 0 | 0 | 0 | 0 | 0 |
| Y02 | 0.04 | 0 | 0 | 0 | 0 | 0 | 0 | 0 | 0 | 0 | 0 |
| Y03 | 0.06 | 0 | 0 | 0 | 0 | 0 | 1 | 0 | 0 | 0 | 0 |
| Y04 | 0.08 | 0 | 0 | 0 | 0 | 0 | 1 | 0 | 0 | 0 | 0 |
| Y05 | 0.10 | 0 | 0 | 0 | 0 | 0 | 0 | 0 | 0 | 0 | 0 |
| Y06 | 0.12 | 0 | 0 | 0 | 0 | 0 | 0 | 1 | 0 | 0 | 0 |
| Y07 | 0.14 | 0 | 0 | 0 | 0 | 0 | 0 | 1 | 0 | 0 | 0 |
| Y08 | 0.16 | 0 | 0 | 0 | 0 | 0 | 0 | 1 | 1 | 0 | 0 |
| Y09 | 0.18 | 0 | 0 | 0 | 0 | 0 | 0 | 0 | 0 | 1 | 0 |
| Y10 | 0.20 | 0 | 0 | 0 | 0 | 0 | 0 | 0 | 0 | 1 | 0 |
| Y11 | 0.22 | 0 | 0 | 0 | 0 | 0 | 0 | 0 | 0 | 0 | 0 |
| Y12 | 0.24 | 0 | 0 | 0 | 0 | 0 | 0 | 0 | 0 | 0 | 0 |
| Y13 | 0.26 | 0 | 0 | 0 | 0 | 0 | 0 | 0 | 0 | 0 | 1 |
| Y14 | 0.28 | 0 | 0 | 0 | 0 | 0 | 0 | 0 | 0 | 0 | 0 |
| Y15 | 0.30 | 0 | 0 | 0 | 0 | 0 | 0 | 0 | 0 | 0 | 0 |
| Y16 | 0.32 | 0 | 0 | 0 | 0 | 0 | 0 | 0 | 0 | 0 | 0 |
| Y17 | 0.34 | 0 | 0 | 0 | 0 | 0 | 0 | 0 | 0 | 0 | 0 |
| Y18 | 0.36 | 0 | 0 | 0 | 0 | 0 | 0 | 0 | 0 | 0 | 0 |
| Y19 | 0.38 | 0 | 0 | 0 | 0 | 0 | 0 | 0 | 0 | 0 | 0 |
| Y20 | 0.40 | 0 | 0 | 0 | 0 | 0 | 0 | 0 | 0 | 0 | 0 |

FIG.13B

DIFFERENCE FROM SPECULAR REFLECTION INTENSITY TARGET ≤ 0.2 % … S1103

| PATCH No. | | X01 | X02 | X03 | X04 | X05 | X06 | X07 | X08 | X09 | X10 |
|---|---|---|---|---|---|---|---|---|---|---|---|
| | INPUT | 0.1 | 0.2 | 0.3 | 0.4 | 0.5 | 0.6 | 0.7 | 0.8 | 0.9 | 1 |
| Y01 | 0.02 | 0 | 0 | 0 | 0 | 0 | 0 | 0 | 0 | 0 | 0 |
| Y02 | 0.04 | 0 | 0 | 0 | 0 | 0 | 0 | 0 | 0 | 0 | 0 |
| Y03 | 0.06 | 0 | 0 | 0 | 0 | 1 | 1 | 0 | 0 | 0 | 0 |
| Y04 | 0.08 | 0 | 0 | 0 | 0 | 1 | 1 | 0 | 0 | 0 | 0 |
| Y05 | 0.10 | 0 | 0 | 0 | 0 | 1 | 1 | 1 | 0 | 0 | 0 |
| Y06 | 0.12 | 0 | 0 | 0 | 0 | 1 | 1 | 1 | 0 | 0 | 0 |
| Y07 | 0.14 | 0 | 0 | 0 | 1 | 1 | 1 | 1 | 1 | 0 | 0 |
| Y08 | 0.16 | 0 | 0 | 0 | 1 | 1 | 1 | 1 | 1 | 0 | 0 |
| Y09 | 0.18 | 0 | 0 | 0 | 1 | 1 | 0 | 1 | 1 | 0 | 0 |
| Y10 | 0.20 | 0 | 0 | 0 | 1 | 1 | 0 | 0 | 0 | 1 | 0 |
| Y11 | 0.22 | 0 | 0 | 0 | 1 | 0 | 0 | 0 | 0 | 0 | 1 |
| Y12 | 0.24 | 0 | 0 | 0 | 1 | 0 | 0 | 0 | 0 | 0 | 0 |
| Y13 | 0.26 | 0 | 0 | 0 | 1 | 0 | 0 | 0 | 0 | 0 | 0 |
| Y14 | 0.28 | 0 | 0 | 0 | 1 | 0 | 0 | 0 | 0 | 0 | 0 |
| Y15 | 0.30 | 0 | 0 | 0 | 1 | 0 | 0 | 0 | 0 | 0 | 0 |
| Y16 | 0.32 | 0 | 0 | 1 | 1 | 0 | 0 | 0 | 0 | 0 | 0 |
| Y17 | 0.34 | 0 | 0 | 1 | 0 | 0 | 0 | 0 | 0 | 0 | 0 |
| Y18 | 0.36 | 0 | 0 | 1 | 0 | 0 | 0 | 0 | 0 | 0 | 0 |
| Y19 | 0.38 | 0 | 0 | 1 | 0 | 0 | 0 | 0 | 0 | 0 | 0 |
| Y20 | 0.40 | 0 | 0 | 1 | 0 | 0 | 0 | 0 | 0 | 0 | 0 |

FIG.13C

OPTICAL DENSITY DIFFERENCE IS EQUAL TO OR SMALLER THAN THRESHOLD
AND SPECULAR REFLECTION INTENSITY DIFFERENCE IS EQUAL TO
OR SMALLER THAN THRESHOLD = CLOSE TO TARGETS ... S1106
→ CLOSEST GRAYSCALE LEVEL AMONG GRAYSCALE LEVELS
AT WHICH ONE SET IS DETERMINED R(6)=4.2
→ SET VALUES WITH RATIO CLOSEST TO 4.2
AS CORRECTION VALUES (X', Y')=(0.7, 0.16) ... S1107

| PATCH No. | | X01 | X02 | X03 | X04 | X05 | X06 | X07 | X08 | X09 | X10 |
|---|---|---|---|---|---|---|---|---|---|---|---|
| | INPUT | 0.1 | 0.2 | 0.3 | 0.4 | 0.5 | 0.6 | 0.7 | 0.8 | 0.9 | 1 |
| Y01 | 0.02 | 0 | 0 | 0 | 0 | 0 | 0 | 0 | 0 | 0 | 0 |
| Y02 | 0.04 | 0 | 0 | 0 | 0 | 0 | 0 | 0 | 0 | 0 | 0 |
| Y03 | 0.06 | 0 | 0 | 0 | 0 | 0 | 10 | 0 | 0 | 0 | 0 |
| Y04 | 0.08 | 0 | 0 | 0 | 0 | 0 | 7.5 | 0 | 0 | 0 | 0 |
| Y05 | 0.10 | 0 | 0 | 0 | 0 | 0 | 0 | 0 | 0 | 0 | 0 |
| Y06 | 0.12 | 0 | 0 | 0 | 0 | 0 | 0 | 5.8 | 0 | 0 | 0 |
| Y07 | 0.14 | 0 | 0 | 0 | 0 | 0 | 0 | 5 | 0 | 0 | 0 |
| Y08 | 0.16 | 0 | 0 | 0 | 0 | 0 | 0 | 4.4 | 5 | 0 | 0 |
| Y09 | 0.18 | 0 | 0 | 0 | 0 | 0 | 0 | 0 | 0 | 0 | 0 |
| Y10 | 0.20 | 0 | 0 | 0 | 0 | 0 | 0 | 0 | 0 | 4.5 | 0 |
| Y11 | 0.22 | 0 | 0 | 0 | 0 | 0 | 0 | 0 | 0 | 0 | 0 |
| Y12 | 0.24 | 0 | 0 | 0 | 0 | 0 | 0 | 0 | 0 | 0 | 0 |
| Y13 | 0.26 | 0 | 0 | 0 | 0 | 0 | 0 | 0 | 0 | 0 | 0 |
| Y14 | 0.28 | 0 | 0 | 0 | 0 | 0 | 0 | 0 | 0 | 0 | 0 |
| Y15 | 0.30 | 0 | 0 | 0 | 0 | 0 | 0 | 0 | 0 | 0 | 0 |
| Y16 | 0.32 | 0 | 0 | 0 | 0 | 0 | 0 | 0 | 0 | 0 | 0 |
| Y17 | 0.34 | 0 | 0 | 0 | 0 | 0 | 0 | 0 | 0 | 0 | 0 |
| Y18 | 0.36 | 0 | 0 | 0 | 0 | 0 | 0 | 0 | 0 | 0 | 0 |
| Y19 | 0.38 | 0 | 0 | 0 | 0 | 0 | 0 | 0 | 0 | 0 | 0 |
| Y20 | 0.40 | 0 | 0 | 0 | 0 | 0 | 0 | 0 | 0 | 0 | 0 |

FIG.13D

| FIG.15A |
| --- |
| FIG.15B |

PRINTING APPARATUS, CONTROL METHOD, AND STORAGE MEDIUM

BACKGROUND

Field

The present disclosure relates to an inkjet printing apparatus.

Description of the Related Art

In an inkjet printing apparatus configured to form an image on a printing medium that does not absorb ink, the ink applied onto the printing medium does not permeate the printing medium, and thus, it is necessary to thicken the ink on the printing medium and suppress occurrence of beading and bleed. As a method of thickening the ink on the printing medium, there is known a method in which ink containing a color material is made to react with a reaction liquid, and the color material is made to aggregate to thicken the ink. Moreover, in the inkjet printing apparatus, there is performed color deviation correction control of correcting an application amount of the ink containing the color material in response to color deviation in which a desired color cannot be outputted due to ejection variation in a printing head or the like. Note that, since ejection variation of the transparent reaction liquid ejected from the printing head can also be a color deviation factor, an application amount of the reaction liquid also needs to be corrected.

Japanese Patent Laid-Open No. 2011-025685 discloses a method of correcting an application amount of an ink containing a color material, based on an optical density of a pattern printed with the ink on a printing medium.

Japanese Patent Laid-Open No. 2016-20039 discloses a method of printing a test pattern of a clear ink and correcting an ejection amount of the clear ink based on a specular reflection intensity of the printed test pattern.

Japanese Patent Laid-Open No. 2011-189627 discloses an invention relating to a printing apparatus that ejects a reaction liquid to an intermediate transfer member, ejects an ink after the reaction liquid, and performs transfer. Specifically, shapes of ink dots in an intermediate image or an image transferred onto a printing medium are measured, and shape information on reaction liquid dots is obtained based on a result of the measurement. Then, feedback to a reaction liquid application step is performed based on the obtained shape information, and at least one of an application amount and an application position of the reaction liquid to the intermediate transfer member is changed.

SUMMARY

In a printing system configured to form an image by causing a reaction liquid and an ink containing a color material to react and thickening the ink on a printing medium, image formation on a printing medium that does not absorb cannot be performed by using one of the reaction liquid and the ink alone (only one of the reaction liquid and the ink). Accordingly, in Japanese Patent Laid-Open Nos. 2011-025685 and 2016-20039, the application amounts of the reaction liquid and the ink cannot be corrected. Moreover, in the printing system using the reaction liquid, an optical density and gloss change depending a ratio between the application amount of the reaction liquid and the application amount of the ink containing the color material. Accordingly, even in the case where only one of the application amount of the reaction liquid and the application amount of the ink is corrected for an optical density and glossiness that are target values (also referred to as targets) in the color deviation correction, this correction cannot make both of the optical density and the gloss match their target values.

The present disclosure can achieve application amount correction that allows a printing result to match a target value of an optical density and a target value of gloss in the case where a reaction liquid and an ink containing a color material are applied.

An embodiment of the present invention provides a printing apparatus having: a printing unit configured to eject a color material ink and a reaction liquid containing a component that reacts with a color material contained in the color material ink; a controller configured to control the printing unit such that the printing unit prints a first test pattern in which a plurality of patches are arranged, the plurality of patches each printed by applying the color material ink and the reaction liquid ejected from the printing unit to an identical area, the plurality of patches varying from one another in an application amount of the color material ink and an application amount of the reaction liquid to each patch; a first obtaining unit configured to obtain an optical density for each of the plurality of patches; a second obtaining unit configured to obtain a specular reflection intensity for each of the plurality of patches; and a first generation unit configured to generate correction information based on the optical density obtained by the first obtaining unit, the specular reflection intensity obtained by the second obtaining unit, a first target value of the optical density for a first input value of the color material ink, and a second target value of the specular reflection intensity for a second input value of the reaction liquid, the correction information being information in which a combination of a first correction value used for correction of the application amount of the color material ink and a second correction value used for correction of the application amount of the reaction liquid is held.

Further features of the present invention will become apparent from the following description of exemplary embodiments with reference to the attached drawings.

BRIEF DESCRIPTION OF THE DRAWINGS

FIG. 8 is a diagram illustrating a test pattern used in calibration processing;

FIGS. 10B and 10C are diagrams illustrating measurement results of patches;

FIGS. 11A and 11B are diagrams for explaining processing of generating a color deviation correction LUT;

FIGS. 12A to 12D are diagrams illustrating a determination method of correction values;

FIGS. 13A to 13D are diagrams illustrating a determination method of the correction values;

DESCRIPTION OF THE EMBODIMENTS

First Embodiment

<Configuration of Inkjet Printing Apparatus>

Figure 1A:
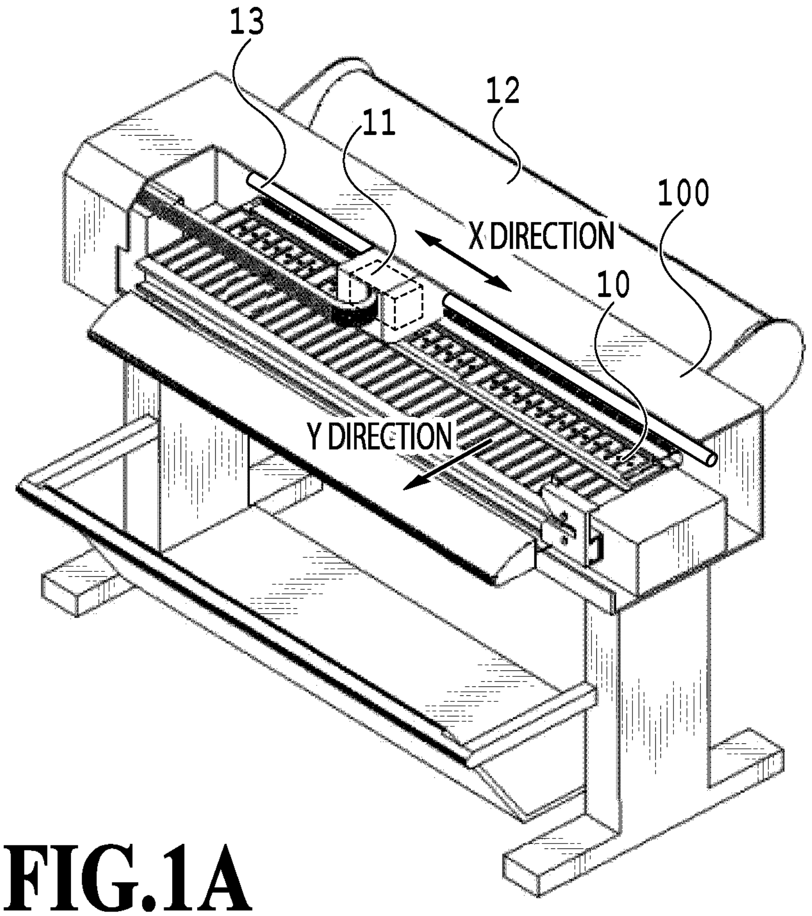
FIGS. 1A and 1B are diagrams illustrating a configuration of an inkjet printing apparatus.
Figure 1B:
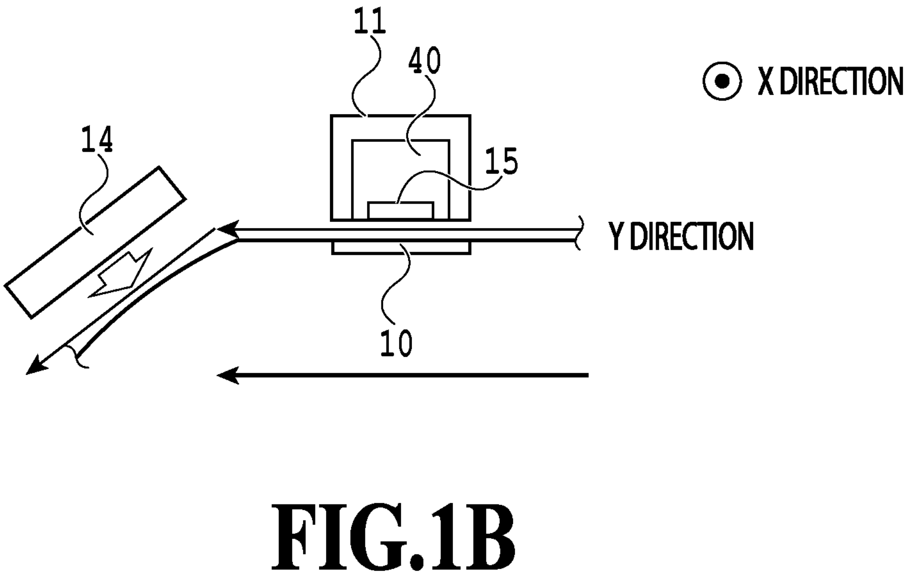

FIG. 1A is a perspective diagram in which an inkjet printing apparatus 100 according to the present embodiment is partially disassembled for explanation of an internal mechanism of the inkjet printing apparatus 100. FIG. 1B is a cross-sectional diagram of a portion of the inkjet printing apparatus 100. Hereinafter, in the present description, "inkjet printing apparatus" is abbreviated as "printing apparatus".

As illustrated in FIGS. 1A and 1B, a printing medium 12 is conveyed in a direction of the arrow Y with drive of a sub-scanning motor (not illustrated). Moreover, a guide shaft 13 is arranged to extend in a direction orthogonal to a conveyance direction (sub-scanning direction) of the printing medium 12. A printing head 40 arranged to face a platen 10 is mounted in a carriage 11, and the carriage 11 is reciprocally moved (made to perform reciprocal scanning) in a direction of the arrow X (main scanning direction) in FIGS. 1A and 1B by drive of a main scanning motor (not illustrated) while being supported on the guide shaft 13. The printing head 40 mounted in the carriage 11 performs printing on the printing medium by ejecting inks to the printing medium according to print data during movement of the carriage 11.

The printing apparatus 100 of the present embodiment employs a method in which the inks are ejected in both of movement of the printing head 40 in a forward path and movement of the printing head 40 in a return path, or so-called bidirectional printing method. In the case where scanning involving one time of printing by the printing head 40 is performed, the sub-scanning motor (not illustrated) conveys the printing medium 12 by a predetermined amount.

In the case where an external host computer (external apparatus) connected to the printing apparatus inputs a printing operation command, the printing medium 12 is fed to a position where the printing head 40 mounted in the carriage 11 can perform printing. Then, the main-scanning of the printing head 40 performed simultaneously with ink ejection according to printing signals and the operation of conveying the printing medium by the predetermined amount are alternately repeated. The printing head 40 thereby performs scanning multiple times on a unit region on the printing medium to form an image. Then, the image formed on the printing medium 12 on the platen 10 is conveyed in the conveyance direction, an upper surface of the printing medium is heated to 100° C. by blowing hot air with a heating mechanism formed of a hot air fan 14, and the inks are thereby fixed by heating. A multi-purpose sensor 15 is a sensor in which sensors for measuring an optical density and a specular reflection intensity of a test pattern are attached. Note that details of the multi-purpose sensor 15 are described later by using FIG. 5.

Figure 2:
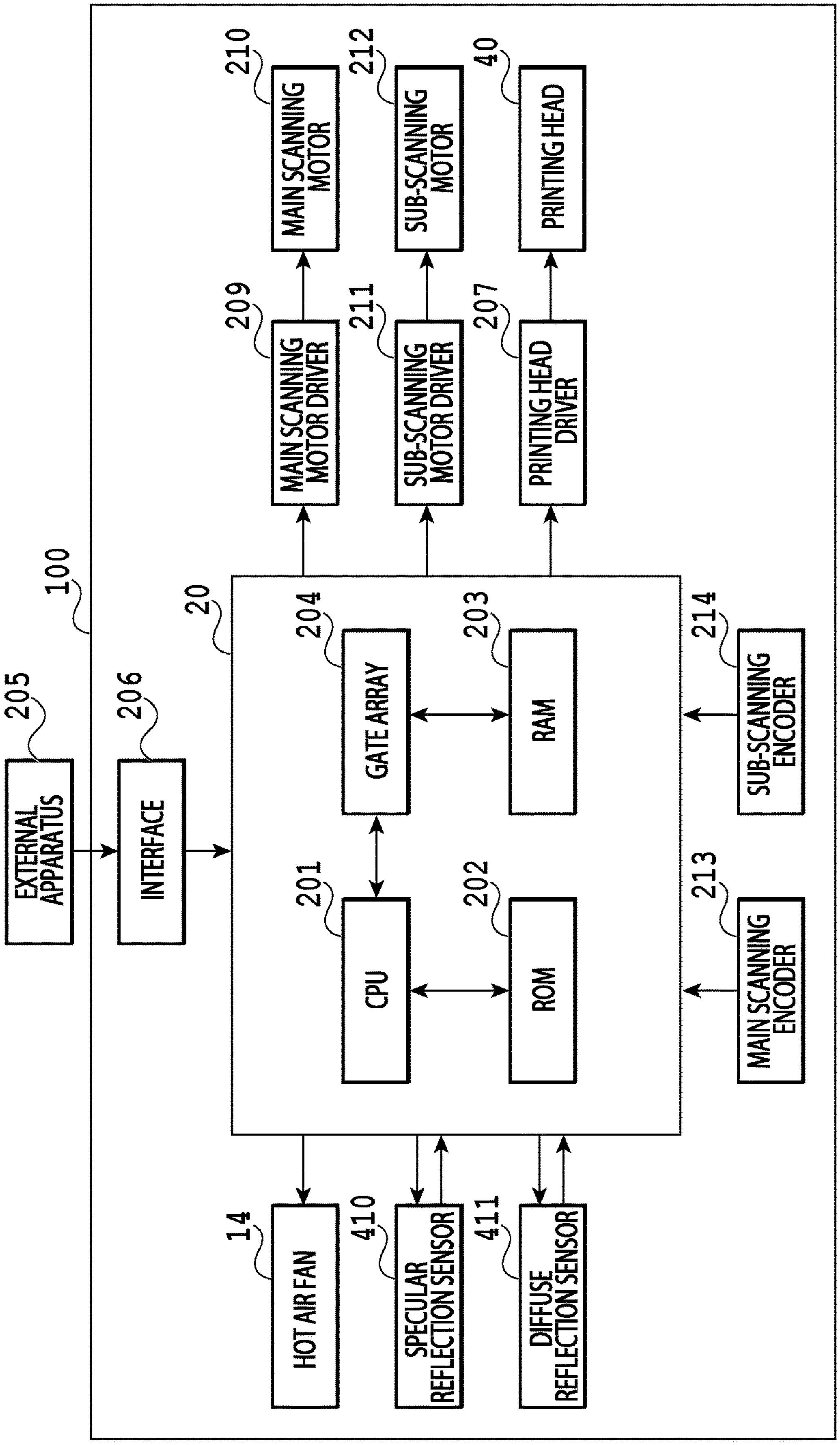
FIG. 2 is a block diagram illustrating a configuration of a control system of the inkjet printing apparatus.

FIG. 2 is a block diagram illustrating a configuration relating to control in the printing apparatus according to the present embodiment. As illustrated in FIG. 2, a control unit 20 in the printing apparatus 100 includes a gate array 204, a CPU 201, a ROM 202, and a RAM 203. An interface 206 is used to input image data from an external apparatus 205. The ROM 202 functions as a memory that stores a program for controlling the printing apparatus and a program for processing the image data, the programs executed by the CPU 201. Various types of data (the image data, the printing signals to be supplied to the printing head, and the like) used for control of the printing apparatus are temporarily stored in the RAM 203.

The gate array 204 supplies the printing signals to the printing head 40, and also performs data transfer among the interface 206, the CPU 201, and the RAM 203. A printing head driver 207 drives the printing head 40 according to the printing signals outputted from the control unit 20 to eject the inks. Moreover, a main scanning motor driver 209 and a sub-scanning motor driver 211 drive a main scanning motor 210 and a sub-scanning motor 212 according to signals outputted by the control unit 20 with reference to signals from a main scanning encoder 213 and a sub-scanning encoder 214. The conveyance operation of the carriage 11 and the conveyance operation of the printing medium 12 are thereby performed. The gate array 204 and the CPU 201 of the control unit 20 convert the image data received from the external apparatus 205 via the interface 206 to printing data, and store the printing data in the RAM 203. Moreover, the control unit 20 drives the main scanning motor driver 209, the sub-scanning motor driver 211, and the printing head driver 207 in synchronization to perform the main scanning of the carriage, the printing operation of the printing head, and the conveyance operation of the printing medium. An image corresponding to the printing data is thereby formed on the printing medium. The hot air fan 14 is driven by signals outputted from the control unit, and heats the printing medium. A specular reflection sensor 410 and a diffuse reflection sensor 411 are used to measure the specular reflection intensity and the optical density of patches in the test pattern used in calibration processing of the present embodiment.

<Configuration of Printing Head>

Figure 3:
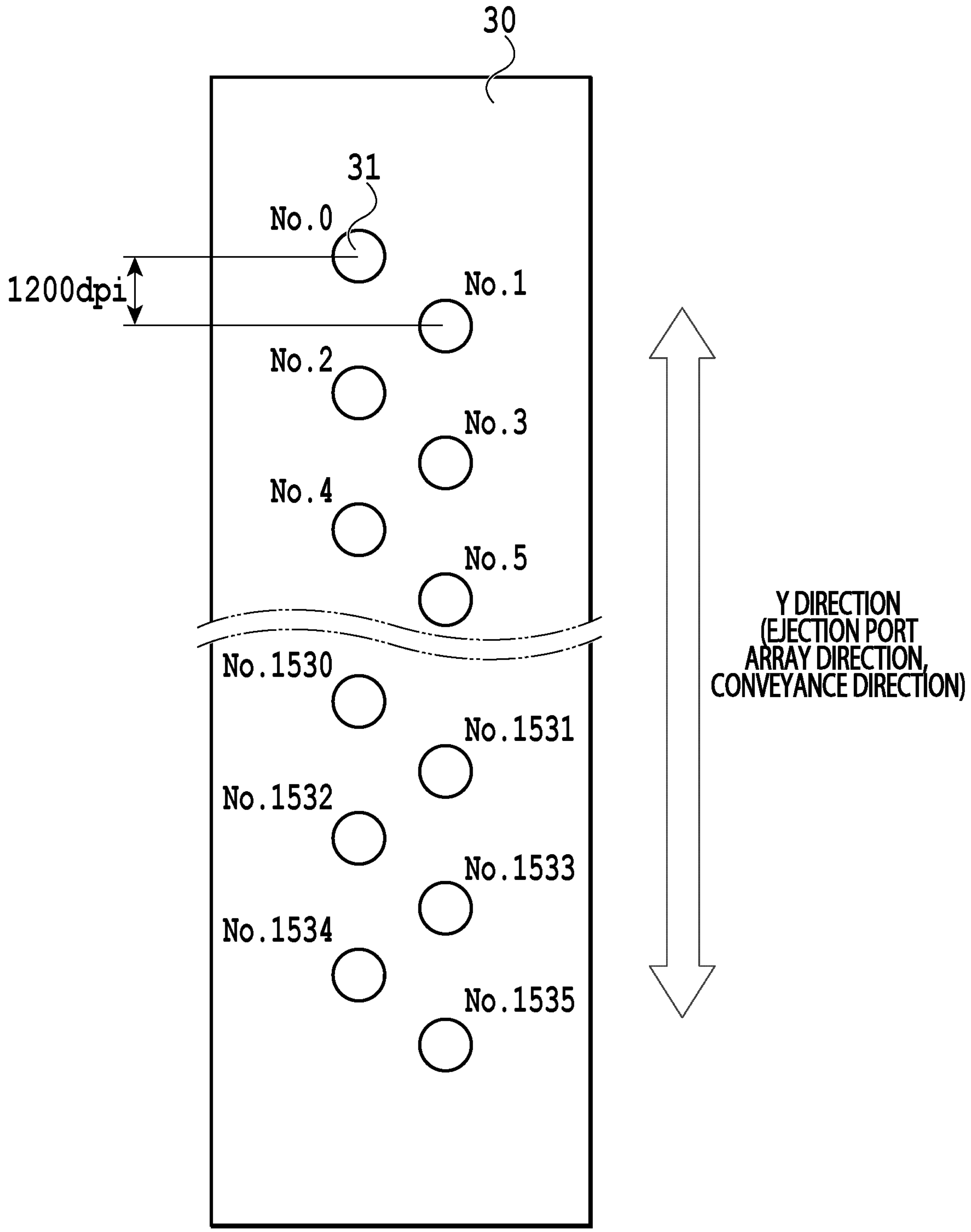
FIG. 3 is a diagram in which an ejection port array formation substrate is observed from the ejection port surface side.
Figure 4:
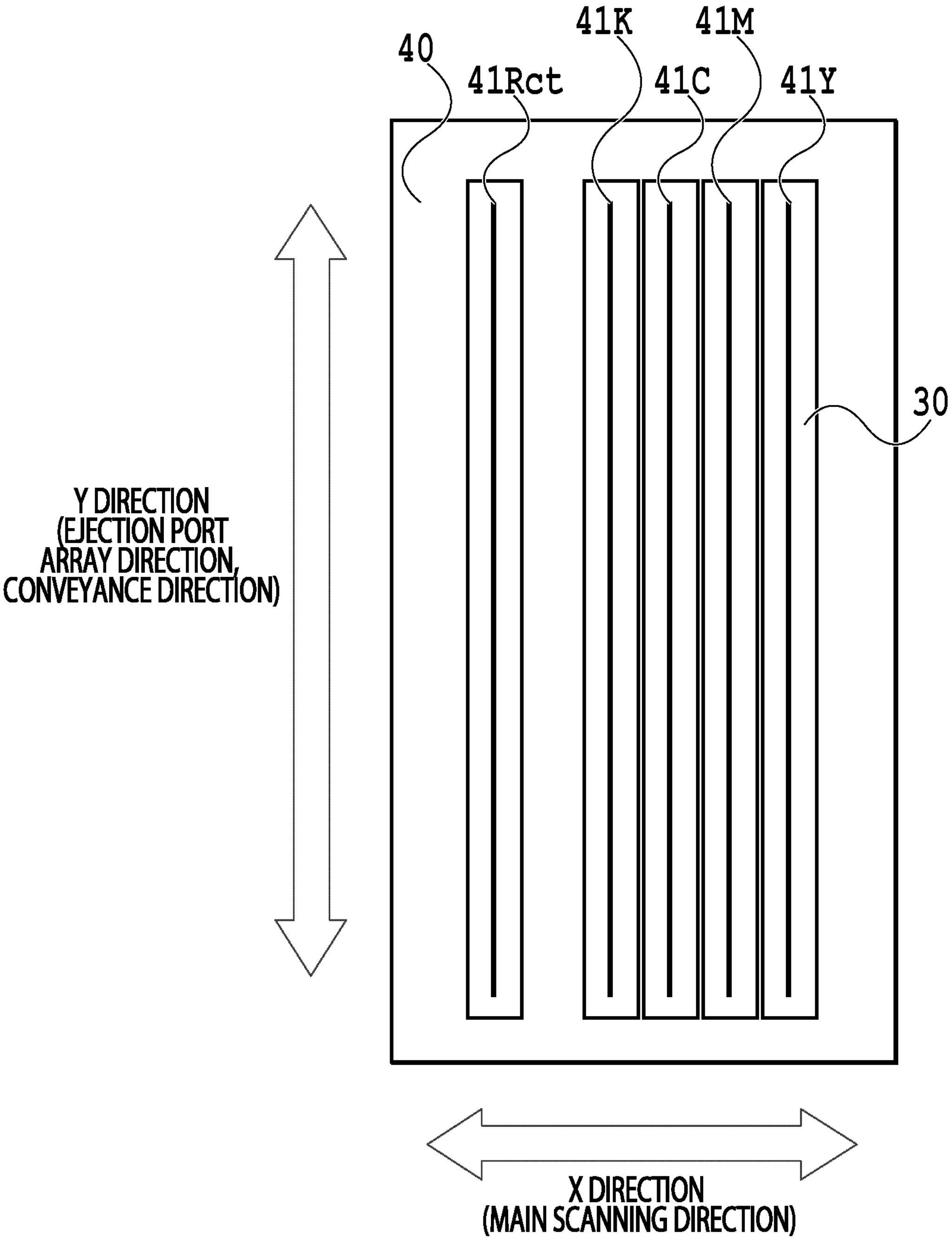
FIG. 4 is a diagram in which a printing head is observed from the ejection port surface side.

FIG. 3 is a plan diagram in which an ejection port array formation substrate 30 forming the printing head 40 used in the present embodiment is observed from the ejection port side. In the printing head 40, an ejection port array for one color is formed by 1,536 ejection ports 31 aligned in the sub-scanning direction at a density of 1,200 ports per inch. FIG. 4 is a plan diagram in which the printing head 40 is observed from the ejection port surface side. Five of the ejection port array formation substrates illustrated in FIG. 3 are installed in the printing head 40 of the present embodiment. A first ejection port array formation substrate includes a black ejection port array 41K, a second ejection port array formation substrate includes a cyan ejection port array 41C, a third ejection port array formation substrate includes a magenta ejection port array 41M, and a fourth ejection port array formation substrate includes a yellow ejection port array 41Y. Moreover, a fifth ejection port array formation substrate includes a reaction liquid ejection port array 41Rct.

The printing head of the present embodiment ejects color material inks as well as a reaction liquid that reacts with pigments included in the color material inks as color materials and that promotes aggregation of the pigments. Particularly, in the case where printing is performed on a printing medium that does not absorb liquid (resin sheet or the like), the reaction liquid and the color material inks are mixed on the printing medium to promote thickening by pigment aggregation and to enable good image forming in which occurrence of beading is suppressed. Note that a droplet ejected from each ejection port of the printing head used in the present embodiment is about 4 ng, and droplets can be ejected at a drive frequency of 21 kHz at maximum.

<Configuration of Sensor>

Figure 5:
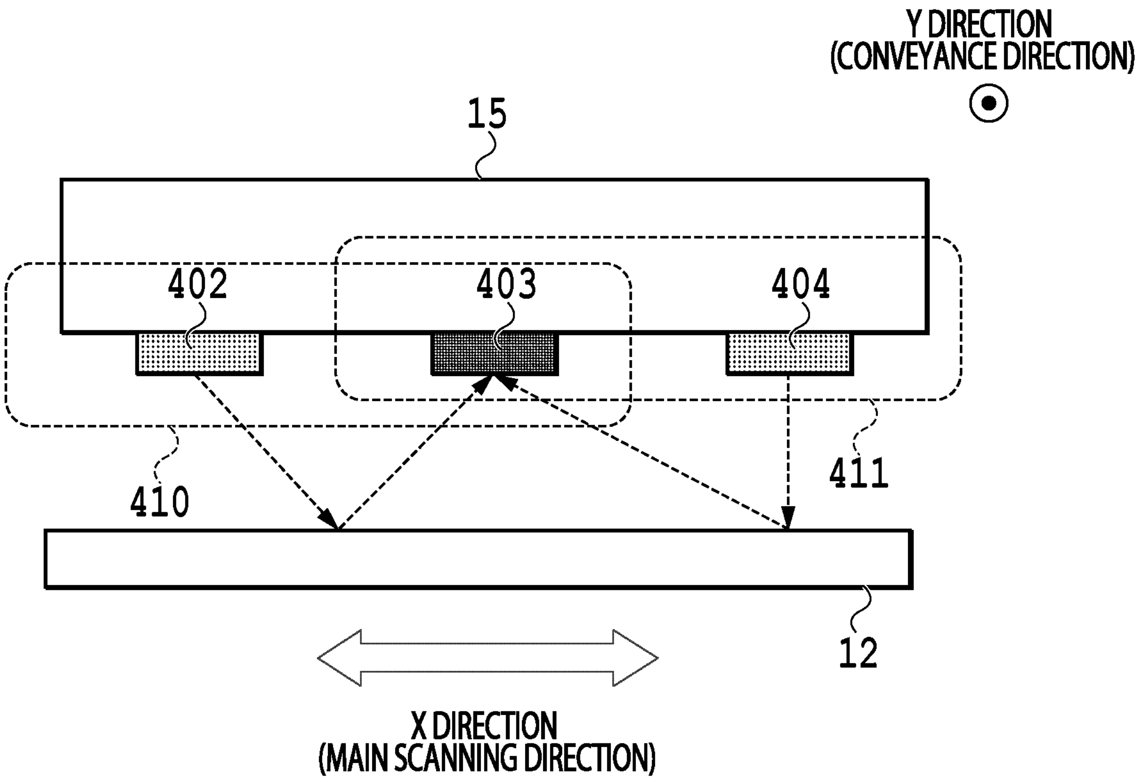
FIG. 5 is a diagram illustrating a configuration of a multi-purpose sensor.

FIG. 5 is a cross-sectional diagram illustrating a configuration of the multi-purpose sensor 15. The multi-purpose sensor 15 is mounted in the carriage 11, and measures or obtains the density and glossiness of the image on the printing medium while being moved with the scanning of the carriage 11. A bottom surface of the multi-purpose sensor 15 is arranged at the same position as an ejection port formation surface of the printing head 40 or at a position farther away from the printing medium than the ejection port formation surface is.

The multi-purpose sensor 15 is provided with a light receiving unit 403 that is implemented by a photodiode and a light emitting unit 402 and a light emitting unit 404 that serve as two light emitting units implemented by three visible LEDs of R, G, and B.

Light emitted from the light emitting unit 402 is incident on the printing medium at an angle of 45°, and light reflected at the same angle, that is specular-reflected light is received in the light receiving unit 403. A combination of the light emitting unit 402 and the light receiving unit 403 functions as a specular reflection sensor, and this combination is assumed to be the specular reflection sensor 410. In the specular-reflected light, a reflected light amount changes by being affected by unevenness and a refractive index of a printing medium surface. Accordingly, the specular reflection sensor 410 is used to detect the glossiness of the printing medium.

Meanwhile, light emitted from the light emitting unit 404 is incident on the printing medium at an angle of 0°, and reflected light thereof is received in the light receiving unit 403. Specifically, a combination of the light emitting unit 404 and the light receiving unit 403 serves as a diffuse reflection sensor, and this combination is assumed to be the diffuse reflection sensor 411. The diffuse reflection sensor 411 detects diffuse-reflected light that includes no specular-reflected light. Accordingly, the diffuse reflection sensor 411 is used as a density sensor that detects the optical density of the printing medium surface. Note that optical elements that condense light are attached to the light emitting unit 402, the light emitting unit 404, and the light receiving unit 403, and a sufficient amount of light emitted from the light emitting units and reflected on the printing medium is received in the light receiving unit.

In the calibration processing to be described later, the conveyance of the printing medium 12 in the conveyance direction and the scanning, in the main scanning direction, of the carriage 11 to which the multi-purpose sensor 15 is attached are performed alternately.

The diffuse reflection sensor 411 in the multi-purpose sensor 15 detects the optical density of each of test patterns printed on the printing medium 12 as an optical reflectivity to perform optical density measurement of the test pattern. The diffuse reflection sensor 411 emits light onto each test pattern formed on the printing medium, and detects a level of reflection intensity reflecting the density of the test pattern. In the case where the color of the printing medium surface is white, the reflection intensity is high. The higher the density of the test pattern is, the lower the reflection intensity is. Meanwhile, the specular reflection sensor 410 in the multi-purpose sensor 15 detects the glossiness of each of the test patterns printed on the printing medium 12 as the optical reflectivity to perform glossiness measurement of the test pattern. In the present embodiment, a straight line connecting the center of the light emitting unit 404 and a center point of an irradiation range of the irradiation light emitted from the light emitting unit 404 to the measurement surface is set as an optical axis of a light emitting element. This optical axis is also the center of a light beam of the irradiation light. Moreover, a line connecting the center of the light receiving unit 403 and a center point of a region (range) that is on the surface of the measurement target and from which the light receiving unit 403 can receive light is set as an optical axis (light receiving axis) of a light receiving element. This light receiving axis is also the center of a light beam of the reflected light reflected on the measurement surface and received by the light receiving unit 403. Note that there may be employed a form in which the light receiving unit 403 is not shared as the light receiving unit of the specular reflection sensor 410 and the light receiving unit of the diffuse reflection sensor 411, and separate light receiving units are provided for the respective sensors. Moreover, the number of colors of the LEDs in the light emitting unit 402 and the light emitting unit 404 are not limited to the above-mentioned number (specifically, three). The combination of the LEDs of colors of R, G, and B is set depending on colors of inks applied to the measured patches. Details are described later together with the calibration processing.

<Composition of Ink>

A composition of each of the color material inks and water-soluble resin fine particle inks used in the present embodiment is described below. In the following description, "parts" and "%" are based on mass unless otherwise noted.

The color material inks containing pigments and the water-soluble resin fine particle inks containing no or little pigments that are used in the present embodiment each contain a water-soluble organic solvent. The water-soluble organic solvent preferably has a boiling point of 150° C. or more and 300° C. or less from viewpoints of wettability and a moisture retaining property of a head orifice face. Moreover, the water-soluble organic solvent is preferably a ketone-based compound such as acetone or cyclohexanone from viewpoints of a function of a film forming aid for a resin particle and a swelling and dissolution property to a printing medium on which a layer of the resin is formed. In addition, a propylene glycol derivative such as tetraethylene glycol dimethyl ether is preferable, and substances such as a heterocyclic compound with lactam structure represented by N-methyl-pyrrolidone and 2-pyrrolidone are particularly preferable.

The content of the water-soluble organic solvent is preferably 3 wt % or more and 30 wt % or less from a viewpoint of ejection performance. The following substances can be given as examples of the water-soluble organic solvent: alkyl alcohols with one to four carbon atoms such as methyl alcohol, ethyl alcohol, isopropyl alcohol, n-butyl alcohol, sec-butyl alcohol, and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; ethylene glycol; alkylene glycols in which an alkylene group has two to six carbon atoms such as propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; polyhydric alcohols such as trimethylolpropane and trimethylolethane; N-methyl-2-pyrrolidone; 2-pyrrolidone; 1,3-dimethyl-2-imidazolidinone; and the like.

The water-soluble organic solvent as described above can be used alone or as a mixture. Moreover, deionized water is preferably used as water. In addition to components described above, a surfactant, a defoaming agent, a preservative, an antifungal agent, and the like can be added to the color material inks and the water-soluble resin fine particle inks used in the present embodiment as appropriate to provide desired physical property values as necessary.

Creation of Resin Fine Particle Dispersion Liquid

Each of the color material inks of the present embodiment contains a water-soluble resin fine particle to cause the printing medium and the color material to tightly adhere to each other and to improve scratch resistance (fixing property) of the printed image. The resin fine particle melts by heat, and film formation of the resin fine particle and drying of the solvent contained in the ink are performed by using a heater. In the present disclosure, the "resin fine particle" means a polymer fine particle present in water in a dispersed state. Specifically, the resin fine particle includes: an acryl resin fine particle synthesized by subjecting monomers of (meth)acrylic acid alkyl ester, (meth)acrylic acid alkylamide, or the like to emulsion polymerization or the like; a styrene-acryl resin fine particle synthesized by subjecting monomers of styrene and (meth)acrylic acid alkyl ester, (meth)acrylic acid alkylamide, or the like to emulsion polymerization or the like; a polyethylene resin fine particle; a polypropylene resin fine particle; a polyurethane resin fine particle; a styrene-butadiene resin fine particle; and the like. Moreover, there may be used a core-shell type resin fine particle in which a core portion and a shell portion forming the resin fine particle have different polymer compositions or a resin fine particle that has an acryl-based fine particle synthesized in advance to control the particle size as a seed particle and that is obtained by performing emulsion polymerization around the seed particle. Furthermore, a hybrid resin fine particle in which different resin fine particles such as an acryl resin fine particle and a urethane resin fine particle are chemically bonded to each other or the like may be used.

Moreover, the "polymer fine particle present in water in a dispersed state" may be in a form of a resin fine particle obtained by subjecting a monomer with a dissociable group to homopolymerization or by subjecting multiple types of monomers with dissociable groups to copolymerization, or so-called self-dispersing resin fine particle dispersion. The dissociable groups herein include a carboxyl group, a sulfonate group, a phosphate group, and the like, and the monomers with these dissociable groups include acrylic acid, methacrylic acid, and the like. Furthermore, a so-called emulsion dispersion resin fine particle dispersion in which the resin fine particle is dispersed by an emulsifier may be used. A material with anionic charge even in the case where the molecular amount is low and the quantity is large can be used as the emulsifier.

A resin fine particle dispersion liquid used in the present embodiment is obtained as follows. First, the following three additive liquids are added little by little dropwise while being agitated and heated to 70° C. under a nitrogen atmosphere to perform polymerization for five hours. The additive liquids are a hydrophobic monomer consisting of 28.5 parts of methyl methacrylate, a mixture liquid containing a hydrophilic monomer and consisting of 4.3 parts of p-styrenesulfonic acid sodium salt and 30 parts of water, and a mixture liquid containing a polymerization initiator and consisting of 0.05 parts of potassium persulfate and 30 parts of water. A 20 mass %-resin fine particle dispersion liquid is thereby obtained.

A method of adjusting each of the color material inks and the reaction liquid is described below.

1. Black Ink (1) Preparation of Dispersion Liquid

First, an anionic polymer P-1 [styrene/butyl acrylate/acrylic acid copolymer (polymerization ratio (weight ratio) =30/40/30) with an acid value of 202 and a weight-average molecular weight of 6,500] is prepared. This polymer is neutralized by a potassium hydroxide aqueous solution and diluted by deionized water to prepare a 10 mass %-polymer aqueous solution.

Then, 600 g of the above polymer solution, 100 g of carbon black, and 300 g of deionized water are mixed and mechanically agitated for predetermined time. Then, non-dispersed objects including coarse particles are removed by centrifugal separation processing to obtain a black dispersion liquid. The pigment concentration of the obtained black dispersion liquid is 10 mass %.

(2) Preparation of Ink

In the preparation of the ink, the above black dispersion liquid is used, and the following components are added to the black dispersion liquid to achieve a predetermined concentration. Next, these components are sufficiently mixed and agitated, and then subjected to pressure filtering by using a micro filter (manufactured by Fujifilm Corporation) with a pore size of 2.5 μm to prepare a pigment ink with a pigment concentration of 2 mass %.

| | |
|---|---|
| Above black dispersion liquid | 20 parts |
| Above resin fine particle dispersion liquid | 40 parts |
| Zonyl FSO-100 (fluorinated surfactant manufactured by DuPont) | 0.05 parts |
| 2-Methyl-1,3-propanediol | 15 parts |
| 2-Pyrrolidone | 5 parts |
| Acetylene glycol EO adduct (manufactured by Kawaken Fine Chemicals Co., Ltd.) | 0.5 parts |
| Deionized water | balance |

2. Cyan Ink (1) Preparation of Dispersion Liquid

First, an AB block polymer with an acid value of 250 and a number-average molecular weight of 3,000 is produced by an ordinary method with benzyl acrylate and methacrylic acid used as raw materials. The AB block polymer is neutralized by a potassium hydroxide aqueous solution and diluted by deionized water to prepare a homogenous 50 mass %-polymer aqueous solution.

Then, 200 g of the above polymer solution, 100 g of C.I. pigment blue 15:3, and 700 g of deionized water are mixed and mechanically agitated for predetermined time. Then, non-dispersed objects including coarse particles are removed by centrifugal separation processing to obtain a cyan dispersion liquid. The pigment concentration of the obtained cyan dispersion liquid is 10 mass %.

(2) Preparation of Ink

In the preparation of the ink, the above cyan dispersion liquid is used, and the following components are added to the cyan dispersion liquid to achieve a predetermined concentration. Next, these components are sufficiently mixed and agitated, and then subjected to pressure filtering by using a micro filter (manufactured by Fujifilm Corporation) with a pore size of 2.5 μm to prepare a pigment ink with a pigment concentration of 2 mass %.

| | |
|---|---|
| Above cyan dispersion liquid | 20 parts |
| Above resin fine particle dispersion liquid | 40 parts |
| Zonyl FSO-100 (fluorinated surfactant manufactured by DuPont) | 0.05 parts |
| 2-Methyl-1,3-propanediol | 15 parts |
| 2-Pyrrolidone | 5 parts |
| Acetylene glycol EO adduct (manufactured by Kawaken Fine Chemicals Co., Ltd.) | 0.5 parts |
| Deionized water | balance |

3. Magenta Ink (1) Preparation of Dispersion Liquid

First, an AB block polymer with an acid value of 300 and a number-average molecular weight of 2,500 is produced by an ordinary method with benzyl acrylate and methacrylic acid used as raw materials. The AB block polymer is neutralized by a potassium hydroxide aqueous solution and diluted by deionized water to prepare a homogenous 50 mass %-polymer aqueous solution.

Then, 100 g of the above polymer solution, 100 g of C.I. pigment red 122, and 800 g of deionized water are mixed and mechanically agitated for predetermined time. Then, non-dispersed objects including coarse particles are removed by centrifugal separation processing to obtain a magenta dispersion liquid. The pigment concentration of the obtained magenta dispersion liquid is 10 mass %.

(2) Preparation of Ink

In the preparation of the ink, the above magenta dispersion liquid is used, and the following components are added to the magenta dispersion liquid to achieve a predetermined concentration. Next, these components are sufficiently mixed and agitated, and then subjected to pressure filtering by using a micro filter (manufactured by Fujifilm Corporation) with a pore size of 2.5 μm to prepare a pigment ink with a pigment concentration of 3 mass %.

| | |
|---|---|
| Above magenta dispersion liquid | 30 parts |
| Above resin fine particle dispersion liquid | 40 parts |
| Zonyl FSO-100 (fluorinated surfactant manufactured by DuPont) | 0.05 parts |
| 2-Methyl-1,3-propanediol | 15 parts |
| 2-Pyrrolidone | 5 parts |
| Acetylene glycol EO adduct (manufactured by Kawaken Fine Chemicals Co., Ltd.) | 0.5 parts |
| Deionized water | balance |

-continued

4. Yellow Ink (1) Preparation of Dispersion Liquid

First, the above anionic polymer P-1 is neutralized by a potassium hydroxide aqueous solution and diluted by deionized water to prepare a homogenous 10 mass %-polymer aqueous solution.

Then, 300 g of the above polymer solution, 100 g of C.I. pigment yellow 74, and 600 g of deionized water are mixed and mechanically agitated for predetermined time. Then, non-dispersed objects including coarse particles are removed by centrifugal separation processing to obtain a yellow dispersion liquid. The pigment concentration of the obtained yellow dispersion liquid is 10 mass %.

(2) Preparation of Ink

The following components are mixed, sufficiently agitated to be dissolved or dispersed, and then subjected to pressure filtering by using a micro filter (manufactured by Fujifilm Corporation) with a pore size of 1.0 μm to prepare a pigment ink with a pigment concentration of 4 mass %.

| | |
|---|---|
| Above yellow dispersion liquid | 40 parts |
| Above resin fine particle dispersion liquid | 40 parts |
| Zonyl FSO-100 (fluorinated surfactant manufactured by DuPont) | 0.025 parts |
| 2-Methyl-1,3-propanediol | 15 parts |
| 2-Pyrrolidone | 5 parts |
| Acetylene glycol EO adduct (manufactured by Kawaken Fine Chemicals Co., Ltd.) | 1 part |
| Deionized water | balance |

5. Reaction Liquid

The reaction liquid used in the present embodiment contains a reactive component that reacts with the pigments included in the inks and causes the pigments to aggregate or turn into gel. The reactive component is such a component that breaks the dispersion stability of the inks including the pigments stably dispersed in the aqueous media by actions of ionizable groups in the case where the reactive component is mixed with the inks on the printing medium or the like.

Note that glutaric acid does not necessarily have to be used as the reactive component of the reaction liquid. In the present embodiment, various organic acids and multivalent metal salts may be used as the reactive components as long as they are water soluble. The content of the organic acids and multivalent metal salts is preferably 0.1 mass % or more and 90.0 mass % or less, more preferably 1.0 mass % or more and 70.0 mass % or less, based on the total mass of the compositions contained in the reaction liquid.

In the present embodiment, as described above, glutaric acid (manufactured by Fujifilm Wako Pure Chemical Corporation) is used and mixed with the following components to prepare a first reaction liquid.

| | |
|---|---|
| Glutaric acid | 2 parts |
| 2-Pyrrolidone | 5 parts |
| 2-Methyl-1,3-propanediol | 15 parts |
| Acetylene glycol EO adduct (manufactured by | 0.5 parts |

-continued

| | |
|---|---|
| Kawaken Fine Chemicals Co., Ltd.) | |
| Deionized water | balance |

<Image Processing>

Image processing for generating the printing data to be used in the printing of the image in the printing apparatus 100 is described below.

Figure 6:
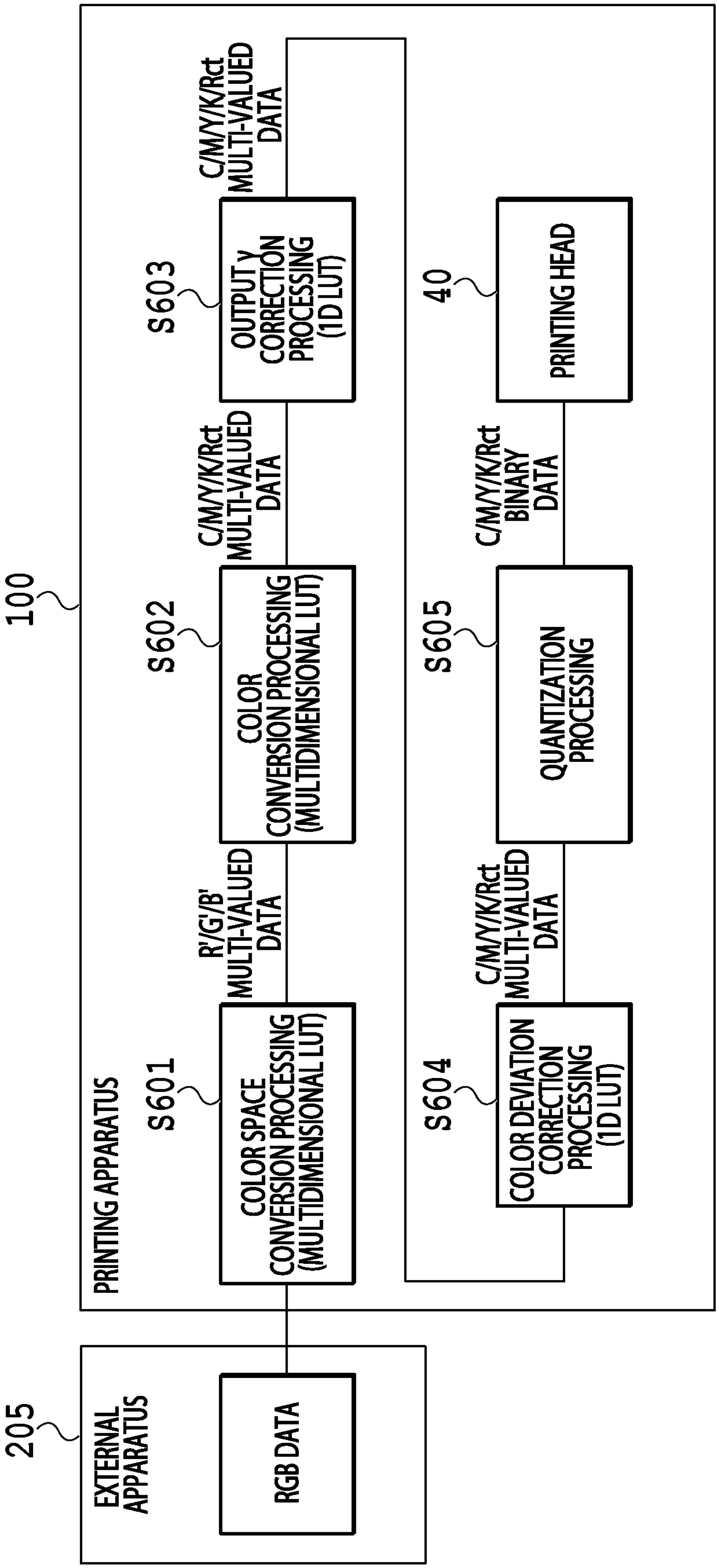
FIG. 6 is a block diagram illustrating a flow of image processing.

FIG. 6 is a block diagram illustrating a flow of the image processing in the present embodiment. Processing up to a point where 1-bit image data is generated from 8-bit luminance data for each of colors of red (R), green (G), and blue (B) is performed in this flow, the 1-bit image data indicating ejection or non-ejection of an ink droplet from each ejection port in the printing head 40. Note that the types of colors and the type of grayscale of each color that are elements of each piece of data are not limited to the above values First, image data expressed by an 8-bit luminance signal for each of R, G, and B (multi-valued data of 256 grayscale levels for each color) is sent from the external apparatus 205 to the printing apparatus 100.

Next, in step S601, color space conversion processing (hereinafter, also referred to as precedent color processing) is performed. In step S601, the image data expressed by the multi-valued luminance signals of R, G, and B is converted to image data expressed by multi-valued signals of R', G', and B' by using a multidimensional LUT. This precedent color processing is performed to correct a difference between a color space of an inputted image expressed by the image data of R, G, and B in a printing target and a color space reproducible by the printing apparatus 100. Note that "step S" is abbreviated as "S" hereinafter.

Next, in S602, color conversion processing (hereinafter, also referred to as subsequent color processing) is performed. The printing apparatus 100 receives data of each of colors of R', G', and B' subjected to the precedent color processing by the host external apparatus 205. The received data of each of the colors of R', G', and B' is converted to multi-valued image data of each of values of C, M, Y, K, and Rct that are ink colors, by using a multi-dimensional LUT 602. This subsequent color processing is processing of converting the multi-valued image data of each of values of R, G, and B on the input side expressed by the luminance signals to multi-valued image data of each of values of C, M, Y, K, and Rct on the output side for expression by density signals.

Next, in S603, output γ correction processing for each color is performed on the multi-valued data of C, M, Y, K, and Rct obtained in the subsequent color processing, by using a one-dimensional LUT. Generally, a relationship between the number of ink droplets (dots) applied per unit area of the printing medium and a printing characteristic such as density obtained by measuring the printed image is not linear. Accordingly, in order to achieve a linear relationship between a 10-bit input grayscale level of each of C, M, Y, K, and Rct and a density level of the image printed based on this input grayscale level, processing of correcting the input grayscale level of multi-valued data of each of C, M, Y, K, and Rct is necessary. This processing is the output γ correction processing. The one-dimensional LUT used in S603 is referred to as "output γ correction table".

Next, in S604, color deviation correction processing is performed. In many cases, an output γ correction table created for the printing head and indicating standard printing characteristics is used as the output γ correction table used in S603 described above. However, as described above, the printing heads or the ejection ports have individual differences regarding ejection characteristics. Accordingly, appropriate density correction for all printing heads or ejection ports cannot be performed by using only the output γ correction table that corrects printing characteristics of a printing head or an ejection port with standard ejection characteristics. Thus, in the present embodiment, the color deviation correction processing is performed on the multi-valued data of C, M, Y, K, and Rct subjected to the output γ correction to determine an application amount of each ink in the image printing.

A color deviation correction look-up table (abbreviated as LUT) used in the color deviation correction processing is set based on information obtained in the calibration processing and indicating ejection characteristics of each ejection port array. This information indicating the ejection characteristics is a set of the optical density and the specular reflection intensity in the test pattern. Note that, although the processing of correcting the data indicating the application amount of the ink as a print material is referred to as "color deviation correction" processing in the present description, the color deviation correction is not limited only to the case where already-defined data is corrected, and the case where data is to be newly determined is also referred to as "color deviation correction". Moreover, processing of determining an application amount of the clear ink containing no color material with respect to the ejection characteristics is also referred to as "color deviation correction" as in the case of the inks containing the color materials.

After the data is subjected to the color deviation correction processing, in S605, the data is subjected to quantization processing performed by index expansion or halftone processing using error diffusion, a dither pattern, or the like. Binary printing data for each of C, M, Y, K, and Rct indicating ejection or non-ejection of the ink droplet from the printing head is generated by these processes, and is outputted.

<Calibration>

Calibration in the present embodiment is described below. The calibration is processing for generating the color deviation correction LUT described above, and is executed in response to a user instruction in the case where no image is printed. Note that there may be employed a form in which the calibration is automatically executed in the case where a predetermined condition is satisfied.

In the calibration in the present embodiment, the one-dimensional LUT for color deviation correction is generated for each of the liquids of C, M, Y, K, and Rct. In the present embodiment, the one-dimensional LUT for color deviation correction is generated based on a two-dimensional target value formed of the optical density and the specular reflection intensity for an input of each color material ink and a measurement value of the optical density and a measurement value of the specular reflection intensity of the test pattern. Since the optical density and the specular reflection intensity change depending on the ratio between the application amount of the reaction liquid and the application amount of the ink containing the color material, a test pattern formed of multiple patches that are formed by applying the reaction liquid and the color material ink to the same regions and in which the application amounts of the reaction liquid and the color material ink are independently varied is used as the test pattern. The two-dimensional target value formed of the set of the optical density and the specular reflection intensity for each color material ink, a method of printing and measuring the test pattern, and a method of generating the one-dimensional LUT for color deviation correction based on target values and the measurement values of the test pattern are described below one by one.

Figure 7:
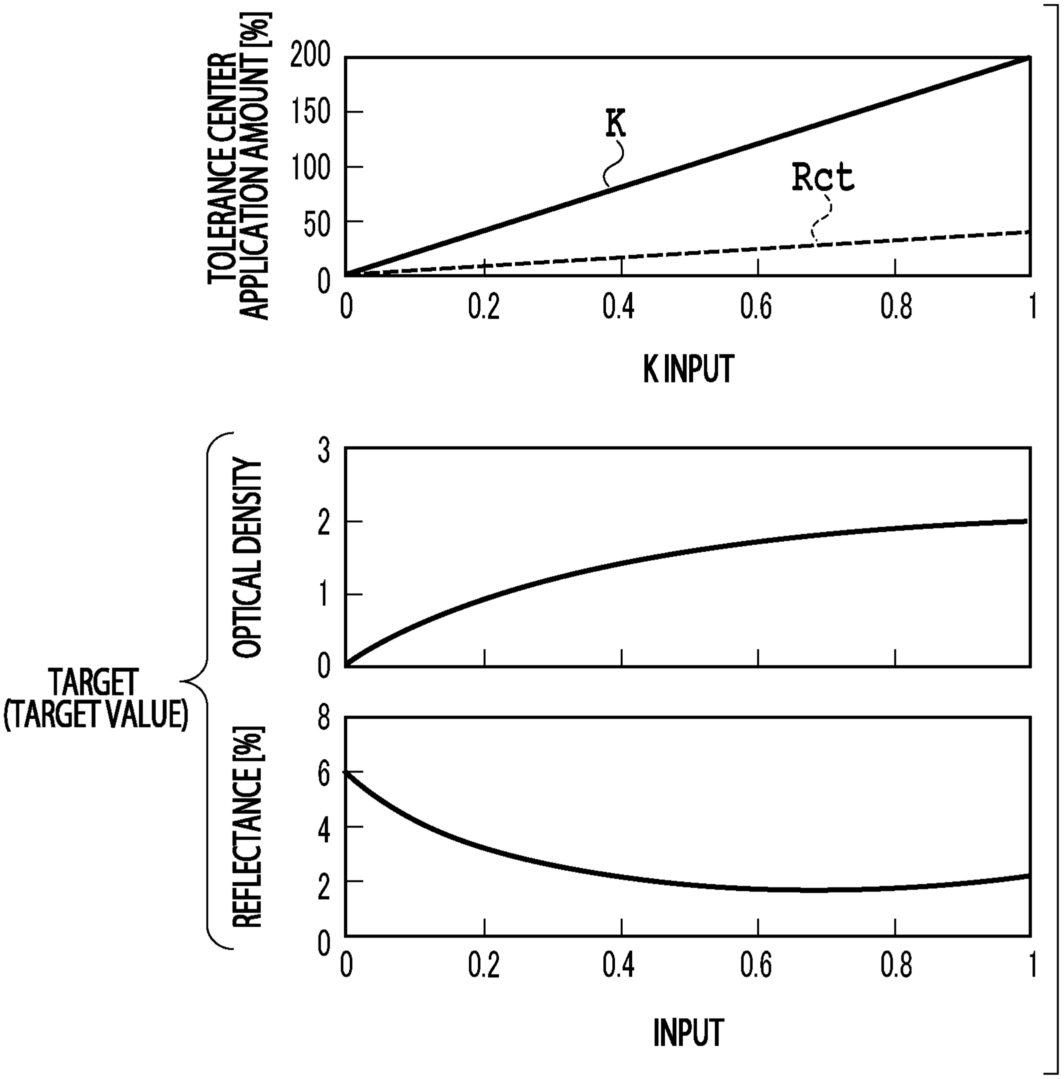
FIG. 7 is a diagram illustrating targets (target values) of a black (K) ink.

FIG. 7 is a graph illustrating target values for an input of the black (K) ink. Scotchcal Graphical Film IJ1220N (gloss finish, 3M Japan Limited) that is an inkjet printing medium for outdoor sign application is used as the printing medium. The ink thickened by causing the reaction liquid and the color material ink to react and causing the color material to aggregate. In a printing system configured to form an image on a printing medium that does not absorb an ink, the optical density and the gloss change depending on the ratio between the application amount of the reaction liquid and the application amount of the color material ink. Accordingly, variation in the application amount of the reaction liquid or the application amount of the color material ink causes the optical density and the gloss to change. Thus, target values (two-dimensional target value) being a combination of the optical density and the gloss for an image of a certain grayscale level need to be used as the target values for the color deviation correction. Note that a reflectance of specular reflection (specular reflection intensity) is used as an index of a gloss value in the present embodiment. The amount of the reaction liquid is uniquely determined and stored for the input of the K ink such that the suppression of bleed and beading is established, in preparation of the target values in advance. Accordingly, the target values are values of the optical density and the specular reflection intensity in the case where the input of the reaction liquid for the input of the K ink is determined and an apparatus configuration such as the printing head performs printing in a state where it is at the center of the tolerance.

FIG. 8 illustrates a test pattern in the present embodiment, and the K ink and the reaction liquid are applied to each of patches forming this test pattern. The patches vary at the grayscale levels of the K ink and the reaction liquid. Accordingly, the test pattern of FIG. 8 is a test pattern that enables measurement of changes in the optical density and the specular reflection intensity with respect to not only variation in the application amount of the K ink but also variation in the ejection amount of the reaction liquid. Arrangement of the patches included in the test pattern is as follows. The K ink application amount is the same for the patches in each of the rows X01 to X10, and the closer the row is to the right end, the more the application amount is. The reaction liquid application amount is the same for the patches in each of the lines Y01 to Y20, and the closer the line is to the bottom, the more the application amount is.

FIG. 8 describes values of the input and values of the printing density for each patch. The printing density [%] is assumed to be such a value that a state where a liquid droplet of 4 ng ejected from the printing head used in the present embodiment is applied onto the printing medium at 1,200 dpi is 100%. Moreover, the hatched patches in FIG. 8 are patches corresponding to the target values for the input values of K ink. Although an example of the test pattern using the K ink is illustrated in FIG. 8, the same applies to the other inks containing the color materials.

Figure 9:
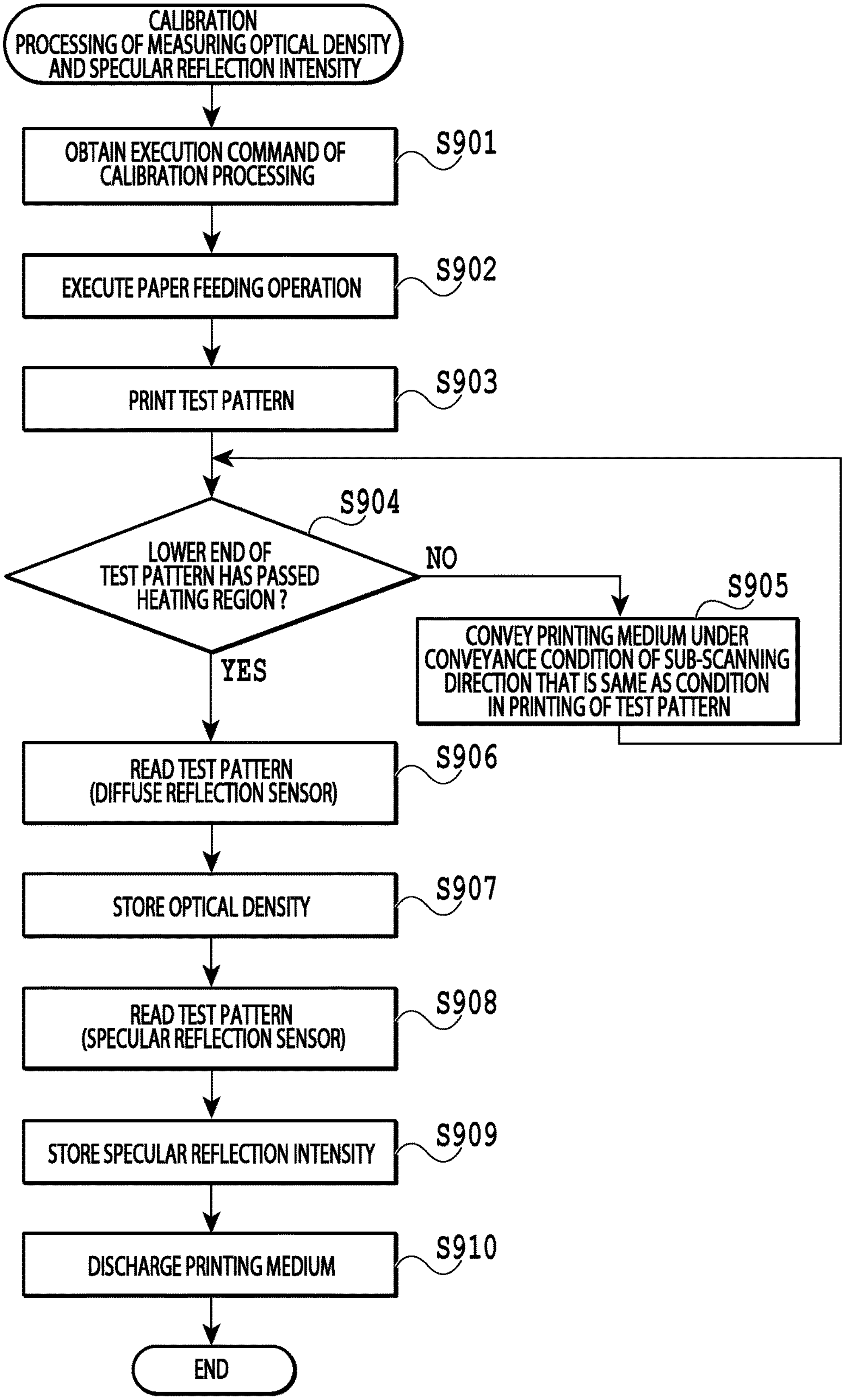
FIG. 9 is a flowchart of measurement processing of an optical density and a specular reflection intensity.

FIG. 9 is a flowchart illustrating a flow of processing of obtaining an optical density characteristic and a specular reflection intensity characteristic of each of the patches to which the ink and the reaction liquid used in the printing apparatus 100 are applied.

In S901, the CPU 201 of the printing apparatus 100 obtains an execution command of the calibration processing. Note that the execution command obtained in the present step may be a command transmitted from the external apparatus 205 or a command inputted by the user operating an operation panel of the printing apparatus 100.

In S902, the CPU 201 of the printing apparatus 100 executes a paper feeding operation, specifically, drives the sub-scanning motor 212 to start feeding of the printing medium.

In the case where the printing medium is conveyed to a region where printing by the printing head is possible, in S903, the CPU 201 prints the test pattern that is illustrated in FIG. 8 and that is used to obtain the optical density characteristic and the specular reflection intensity characteristic of each patch to which the color material ink and the reaction liquid are applied. In this case, the conveyance operation of conveying the printing medium in the conveyance direction and the print scanning of performing scanning of the carriage 11 in the scanning direction by driving the main scanning motor 210 are alternately performed to print the test pattern. Note that the test pattern is preferably printed in the same conditions (referred to as printing conditions. Specifically, the number of times of print scanning, a drive condition of the printing head, and the like) as conditions in actual printing.

After S903, the printing medium is conveyed to heat and dry the printed test pattern, and the heating mechanism including the hot air fan 14 blows hot air to the conveyed printing medium. Then, in S904, the CPU 201 of the printing apparatus 100 determines whether a lower end of the printed test pattern has passed a heating region that is a region to which the hot air of the heating mechanism including the hot air fan 14 is blown. In the case the determination result of the present step is true, the CPU 201 proceeds to S906. In the case where the determination result is false, the CPU 201 proceeds to S905.

In S905, the CPU 201 of the printing apparatus 100 continues conveyance of the printing medium in the conveyance direction (sub-scanning direction) until the printing medium passes the above-mentioned heating region. Note that, in the present step, the printing medium is conveyed in the same conveyance conditions as those in the test pattern printing.

In S906, the CPU 201 of the printing apparatus 100 starts measurement of the reflection intensity of each patch by reading the test pattern with the diffuse reflection sensor 411 of the multi-purpose sensor 15. The measurement of the reflection intensity is performed by turning on the LEDs in the light emitting unit 404 mounted in the multi-purpose sensor 15 one by one such that an LED suitable for a target ink color whose optical density is to be measured is turned on, and reading the reflected light (diffused light) with the light receiving unit 403. For example, a green (G) LED is turned on in measurement of a test pattern printed by using the magenta (M) ink and a blank portion (white) where no test pattern is printed. A blue (B) LED is turned on in measurement of test patterns printed by using the yellow (M) ink and the black (K) ink and the blank portion (white) where no test pattern is printed. A red (R) LED is turned on in measurement of a test pattern printed by using the cyan (C) ink and the blank portion (white) where no test pattern is printed. A measurement result of the blank portion (white) is used as a reference value in density value calculation of the test patterns printed by using the color material inks.

In the case where the reading of the test pattern in S906 is completed, in S907, the CPU 201 of the printing apparatus 100 calculates the optical density of each patch based on the measurement value of the patch and the measurement value of the blank portion. Information on the optical density calculated in the present step is stored in the RAM 203.

Next, in S908, the CPU 201 of the printing apparatus 100 starts the measurement of the reflection intensity of each patch by reading the test pattern with the specular reflection sensor 410 of the multi-purpose sensor 15. The measurement of the reflection intensity is performed by turning on the LEDs of the light emitting unit 402 mounted in the multi-purpose sensor 15 and reading the reflected light (specular-reflected light) with the light receiving unit 403. In the present embodiment, the reflectance is measured by causing all of the R, G, and B LEDs to emit light.

In the case where the reading of the test pattern in S908 is completed, in S909, the CPU 201 of the printing apparatus 100 calculates the specular reflection intensity of each patch based on the measurement value of the patch. Specifically, the inkjet printing apparatus of the present embodiment includes a black plate glass for obtaining a reference of reflectance at a position where the multi-purpose sensor 15 can perform measurement, and calculates the specular reflection intensity of each patch with the specular reflection intensity for the black plate glass being the reference. Note that information on the specular reflection intensity calculated in the present step is stored in the RAM 203.

Then, in S910, the CPU 201 of the printing apparatus 100 executes processing of discharging the printing medium, and terminates the series of processes.

Although the information on the optical density and the information on the specular reflection intensity are stored in the RAM 203 in the present embodiment, these pieces of information may be stored in units other than the RAM 203. For example, these pieces of information may be stored in a storage device included in the external apparatus 205.

Figure 10A:
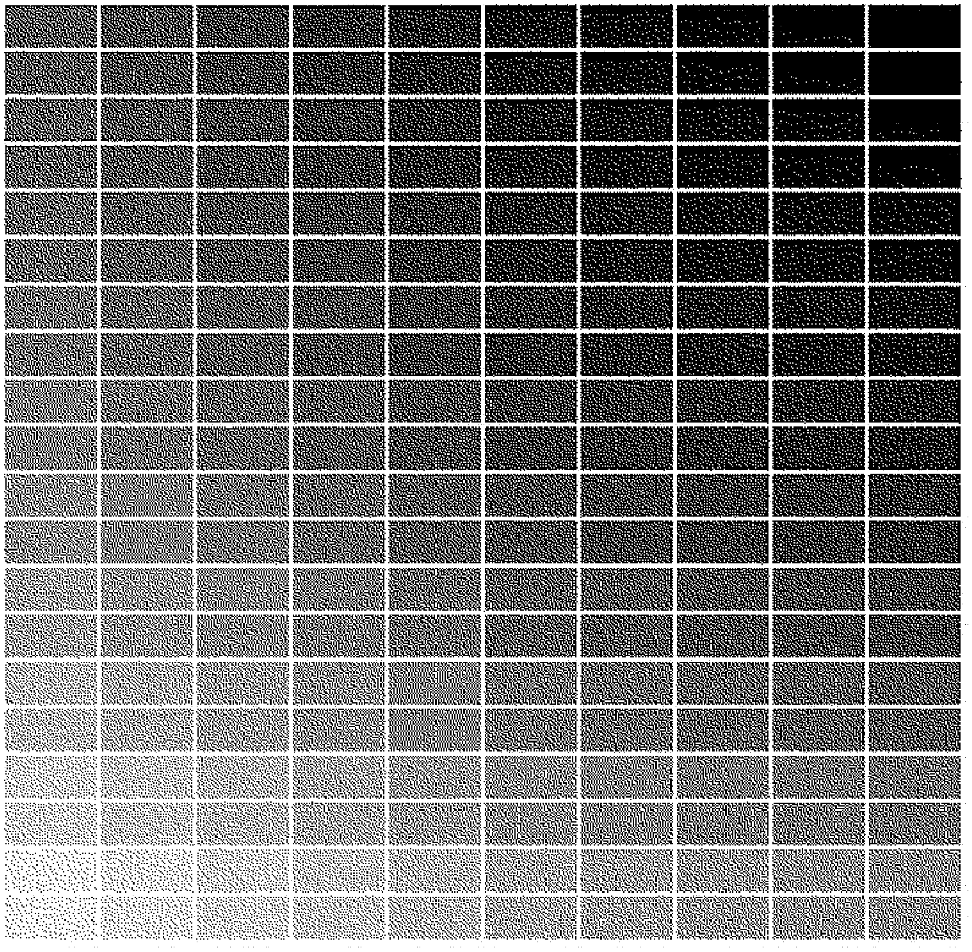
FIG. 10A is a diagram illustrating a test pattern printing result.

FIG. 10A illustrates a printing result of the test pattern printed in the processing illustrated in FIG. 9. FIG. 10B illustrates the measurement result of the optical density for each patch and the target (target value) for each input value of the K ink, and FIG. 10C illustrates the measurement result of the specular reflection intensity for each patch and the target (target value) for each input value of the K ink. Note that FIGS. 10A to 10C each illustrate a result of printing under a printing condition of six passes performed by using Scotchcal Graphical Film IJ1220N (gloss finish, 3M Japan Limited) as the printing medium, Scotchcal Graphical Film IJ1220N being a vinyl chloride sheet for outdoor sign application and being an inkjet printing medium.

From the results illustrated in FIGS. 10B and 10C, it is found that the optical density and the specular reflection intensity change depending on the ratio between the application mount of the color material ink and the application amount of the reaction liquid in the ink system using the reaction liquid. Specifically, the larger the color material ink application amount is, the higher the optical density is, and the larger the reaction liquid application amount is, the lower the optical density is.

Meanwhile, the specular reflection intensity (gloss) has the following characteristics in a region where the reaction liquid application amount is relatively small. In a region where the application amount of the color material ink is relatively small, the larger the application amount of the color material ink is, the lower the specular reflection intensity is. In a region where the application amount of the color material ink is relatively large, the larger the application amount of the color material ink is, the higher the specular intensity is. Moreover, in a region where the reaction liquid application amount is relatively large, the larger the application amount of the color material ink is, the lower the specular reflection intensity is. Furthermore, regarding the reaction liquid, the larger the application amount of the reaction liquid is, the lower the specular reflection intensity is, irrespective of the application amount of the color material ink.

Image quality such as the optical density and the specular reflection intensity (gloss) changes depending on a coverage of the ink, gloss of the blank portion, and a level of color material aggregation that depends on the ratio between the application amount of the reaction liquid and the application amount of the color material ink (the higher the proportion of the reaction liquid is, the more likely the color material is to aggregate, and the lower the optical density and the gloss tend to be).

In the case where the printing system and the printing medium of the present embodiment are used, the gloss of the blank portion is higher than gloss of a solid film of the ink, and the higher the coverage of the ink film is, the lower the gloss is. Accordingly, in the region where the application amount of the color material ink is relatively small, the larger the color material ink application amount is, the lower the specular reflection intensity is.

Meanwhile, in a region where the reaction liquid application amount is small and the application amount of the color material ink is relatively large, after the coverage exceeds 1, leveling of the ink film tends occur due to a small reaction liquid ratio and a low level of color material aggregation, and the larger the application amount of the color material ink is, the higher the gloss is. This phenomenon noticeably occurs particularly in the case where printing is performed on the printing medium that does not absorb inks by using the printing system that uses the reaction liquid. However, this phenomenon does not occur only in the printing medium that does not absorb inks such as the vinyl chloride sheet used in the present embodiment. For example, a similar phenomenon occurs also in a printing medium such as a printing coated paper that is less likely to absorb inks than an inkjet-dedicated paper. Accordingly, effects of the present disclosure can be obtained by applying the present embodiment.

Description is given of a printing medium with no permeability at all such as the vinyl chloride sheet used in the present embodiment and the printing coated paper with very low permeability to water-soluble inks. The vinyl chloride sheet is a soft sheet manufactured by adding a plasticizer to a vinyl chloride resin being a main raw material, and has an excellent printing property in gravure printing, screen printing, and the like and an excellent embossing property (easiness of forming uneven patterns by embossing). Since various types of expression is possible by using the combination of these materials, the combination of these materials is used in many products such as tarpaulin, canvas, and wall paper.

Since the main raw material of the vinyl chloride sheet is the vinyl chloride resin, the vinyl chloride sheet has no permeability to water-soluble inks at all. Accordingly, the inks overflow on the surface of the sheet, and image defect and drying defects noticeably occur. In the present embodiment, Scotchcal Graphical Film IJ1220N (gloss finish, 3M Japan Limited) that is a vinyl chloride sheet for outdoor sign application and that is an inkjet printing medium is adopted as the printing medium. Meanwhile, the printing coated paper is a formal (genuine) printing sheet that is actually used in production printing to be formed into in a product (merchandise). The paper uses pulp as a raw material. The paper used as it is in this state is a non-coated paper, and the paper whose surface is smoothly coated with a white pigment or the like is the coated paper. A coating layer is formed by coating the paper with a mixture coating material of a sizing agent (synthesized resin or the like), a loading material (kaolin or the like), a strengthening agent (starch), and the like at about several to 40 g/m$^2$, the sizing agent being an agent that limits liquid absorbability of gaps between pulp fibers and prevents bleed of a water-base pen, the loading material being a material that increases opacity, whiteness, smoothness, and the like. The diameter of an average capillary hole in the coated paper has a normal distribution centered around 0.06 μm, and many capillary tubes allow water content to permeate (capillary action). However, since the capacity of these fine holes are far smaller than that of the inkjet-dedicated paper, the permeability is low.

As a method of evaluating the permeability of the printing medium to the ink, there is the Bristow method described in "test method of liquid absorptivity of paper and paperboard" in paper and pulp test method No. 51 of Japan TAPPI. Since many commercially-available books describe this process, detailed description of this process omitted. However, the outline is as follows.

A certain amount of the ink is poured into a holding container having an opening slit with a predetermined size, and is brought into contact with the printing medium processed into a strip shape and wound around a disc, through the slit. The disc is rotated with the position of the holding container fixed, and the area (length) of an ink band transferred onto the printing medium is measured.

The transfer amount (ml/m$^2$) per unit area can be calculated from the area of the ink band. The transfer amount (ml/m$^2$) indicates the volume of the ink absorbed by the printing medium in predetermined time. The predetermined time is defined as transfer time in this case. The transfer time corresponds to time of contact between the slit and the printing medium, and is derived based on the speed of the disc and the width of the opening slit.

A transfer amount of the water-soluble ink for a general printing coated paper is measured by the Bristow method, and the transfer amount in transfer time of one second is smaller than 20 ml/m$^2$. Note that many inkjet-dedicated papers have transfer amounts of 30 ml/m$^2$ or higher in measurement by the Bristow method. However, there are inkjet-dedicated papers with transfer amounts of 20 ml/m$^2$ or less, and such printing media can be referred to as low-absorbency printing media though they are inkjet-dedicated papers. In other words, the contents of the present disclosure can be applied not only to the printing coated paper but also to a general printing medium to obtain the effects of the present disclosure, as long as the general printing medium is the low-absorbency printing medium.

Next, processing of generating the one-dimensional LUT for color deviation correction based on the measurement results of the optical density and the specular reflection intensity obtained in the processing of FIG. 9 and illustrated in FIGS. 10A and 10C is described by using FIGS. 11A to 13D. The LUT generated in this processing is the one-dimensional LUT for correction used in the color deviation correction processing (FIG. 6) of S604 described above.

Figure 11A:
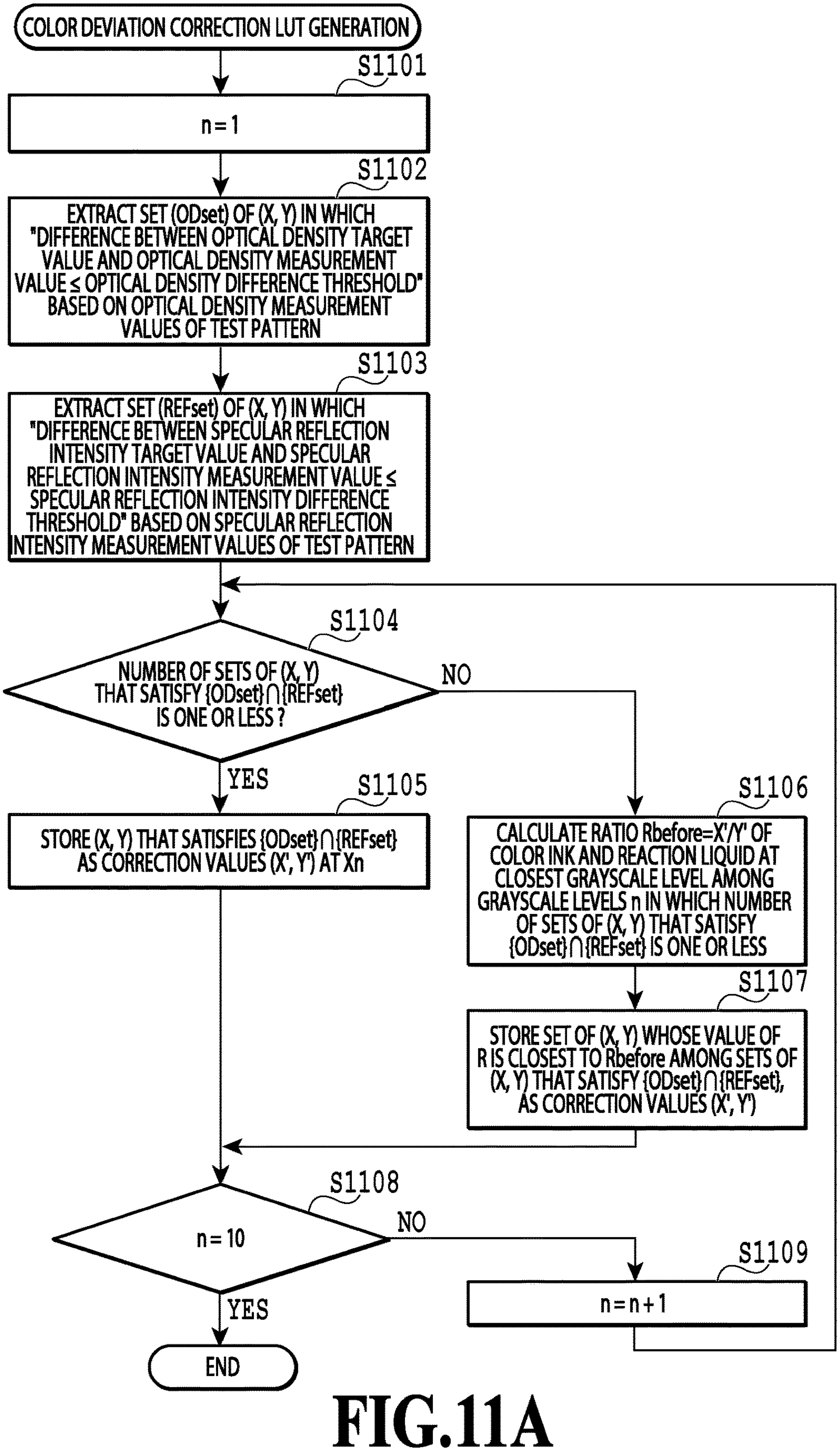

FIG. 11A is a flowchart illustrating a flow of the processing of generating the one-dimensional LUT for color deviation correction. FIG. 11B is a table in which thresholds used in S1102 and S1103 in FIG. 11A are held.

FIGS. 12A to 12D are diagrams explaining results of performing the processing of FIG. 11A in the case where the input (value) of K is 0.6. Specifically, FIG. 12A is a table for holding a combination (combination of a target value of the optical density and a target value of the specular reflection intensity (reflectance)) uniquely defined for each combination of the inputs (values) of the color material ink and the reaction liquid.

FIGS. 13A to 13D are diagrams explaining results of performing the processing of FIG. 11A in the case where the input (value) of K is 0.8. The processing of generating the one-dimensional LUT for color deviation correction according to the steps of FIG. 11A is described below. Note that the following processing proceeds in the ascending order of the input value of the color material ink.

In S1101, the CPU 201 of the printing apparatus 100 initializes a parameter n for specifying the grayscale level of interest among the grayscale levels to be sequentially processed, that is sets n=1. Note that, in the present embodiment, n is one of integers 1 to 10 (this means that the input X of K changes in ten levels).

In S1102, the CPU 201 extracts patches in which a difference between the optical density target (target value) for the input value of the color material ink and the measurement result of the optical density illustrated in FIG. 10B is equal to or smaller than a corresponding one of the thresholds illustrated in FIG. 11B.

FIG. 12B illustrates an extraction result of the processing of S1102 performed for the case where the input (value) of K is 0.6, and FIG. 13B illustrates an extraction result of the processing of S1102 performed for the case where the input (value) of K is 0.8. The hatched patches in FIGS. 12B and 13B are patches in which the difference between the measured optical density and the target optical density is equal to or lower than the threshold.

Subsequent to S1102, in S1103, the CPU 201 performs processing similar to that performed for the optical density in S1102, for the target value and the measurement result of the specular reflection intensity. Specifically, the CPU 201 extracts patches in which a difference between the target value of the specular reflection intensity for the input value of the color material ink and the measurement result of the specular reflection intensity illustrated in FIG. 10C is equal to or smaller than a corresponding one of the thresholds illustrated in FIG. 11B.

FIG. 12C illustrates a result of the processing of S1103 performed for the case where the input (value) of K is 0.6, and FIG. 13C illustrates a result of the processing of S1103 performed for the case where the input (value) of K is 0.8. The hatched patches in FIGS. 12C and 13C are patches in which the difference between the measured specular reflection intensity and the target specular reflection intensity is equal to or lower than the threshold.

The patches extracted in S1102 are patches close to the target value of the optical density, and the patches extracted in S1103 are patches close to the target value of the specular reflection intensity.

In S1104, the CPU 201 determines whether each of the patches extracted in S1102 is extracted also in S1103, and based on this determination, determines whether the number of patches extracted in both of S1102 and S1103 is one or less. In the case where the determination result is true, the CPU 201 proceeds to S1105. In the case where the determination result is false, the CPU 201 proceeds to S1106.

In S1105, the CPU 201 stores values corresponding to the patch extracted in both of S1102 and S1103 as correction values (X', Y') at Xn.

Description is given by using a specific example. In the case where the input of K is 0.6, the patches that are hatched in FIG. 12B and that are also hatched in FIG. 12C show optical densities and specular reflection intensity close to the targets, and values corresponding to these patches are candidates of the correction values for the targets. The hatched patch in FIG. 12D corresponds to such a patch. In this case, there is only one corresponding patch in the test pattern. Accordingly, in S1104, the flow enters a branch in which the number of corresponding patches is one or less (YES in S1104). Then, in S1105, the correction values for the inputs of targets (color material ink X, reaction liquid Y)=(0.6, 0.12) are determined to be (0.5, 0.12), and the determined correction values are stored.

Moreover, in the case where the input of K is 0.8, the patches that are hatched in FIG. 13B and that are also hatched in FIG. 13C are candidate patches indicating candidates of the correction values, and are illustrated in FIG. 13D. In this case, multiple corresponding candidate patches are present in the test pattern. Accordingly, in S1104, the flow enters a branch in which the number of corresponding patches is not one or less (NO in S1104).

In this case, since there are multiple candidate patches, it is necessary to select one of the multiple candidate patches to determine one set of (one combination of) correction values. In the present embodiment, for each of the candidate patches at the grayscale level of interest, the input value of the color material ink is divided by the input value of the reaction liquid to calculate a ratio R between the input value of the color material ink and the input value of the reaction liquid, and R is obtained for each patch. Then, a ratio R closest to an estimation value among the ratios R for the candidate patches (multiple patches are present) indicating the candidates of the correction values is obtained, and values indicated by the patch corresponding to this R is set as the correction values. Regarding this "estimation value", a ratio $R_{before}$ at a grayscale level that is lower than the grayscale level of interest and at which the CPU 201 was able to determine one correction value candidate patch is set as the estimation value.

Specifically, in S1106, the CPU 201 finds a grayscale level that is on the lower grayscale side of the grayscale level of interest and where there is only one patch in which the differences between the targets and the measurement values are equal to or smaller than the thresholds. Then, the CPU 201 calculates the value $R_{before}$ obtained by dividing the input value of the color material ink by the input value of the reaction liquid corresponding to the patch indicating the correction values at this grayscale level.

In S1107, the CPU 201 calculates the value R obtained by dividing the input value of the color material ink by the input value of the reaction liquid, for each of the multiple candidate patches. Then, the CPU 201 specifies a patch corresponding to R that is closest to $R_{before}$ calculated in S1106 among the calculated values R. Then, the CPU 201 stores the values corresponding to the specified patch as the correction values (X', Y') at Xn.

Regarding the case where the input of K is 0.8, the hatched patches among the patches illustrated in FIG. 13D are the candidate patches, and a numerical value described in each patch is the value of R. In the present embodiment, the case where the candidate of the correction values has been determined to be one candidate at the grayscale level lower than 0.8 that is the grayscale level of interest is the case where the input of K is 0.6. Accordingly, 4.2 that is the value of R in this case is set as the estimation value. Then, values indicated by a patch with R closest to this estimation value are set as the correction values. Specifically, the correction values for the inputs of targets (color material ink X, reaction liquid Y)=(0.8, 0.16) are determined to be (0.7, 0.16).

Figure 14A:
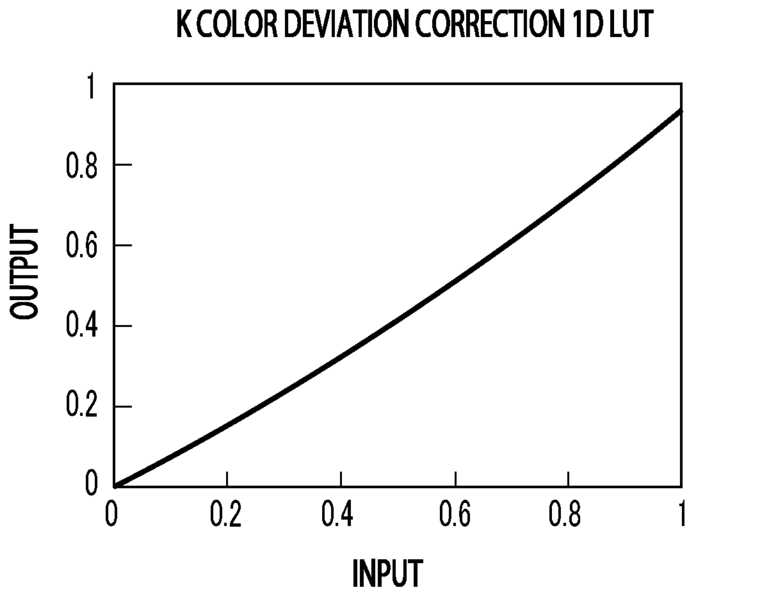
FIGS. 14A and 14B are diagrams illustrating color deviation correction one-dimensional LUTs.
Figure 14B:
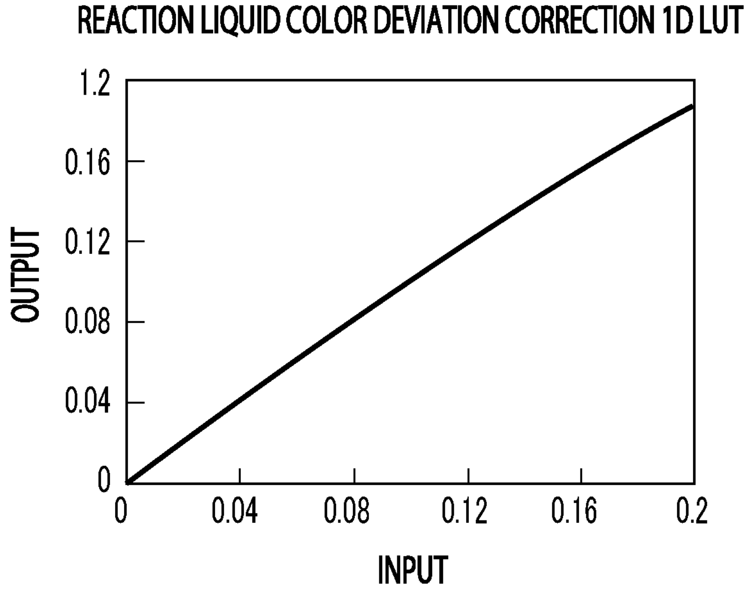

The color deviation correction one-dimensional LUT according to the present embodiment is generated by obtaining relationships between the values of the color material ink (X) and reaction liquid (Y) in the target table illustrated in FIG. 12A and the correction values obtained in the processing of FIGS. 11A and 11B with the values being inputs and the correction values being outputs, at each grayscale level (at each of n=1 to 10). In this case, the one-dimensional LUT for color deviation correction at all grayscale levels can be generated by using polynomial approximation or the like based on the correction values at the grayscale levels corresponding to the patches of the test pattern. FIGS. 14A and 14B each illustrate the one-dimensional LUT generated by performing the processing of FIG. 11A based on the target values and the measurement results of the optical density and the specular reflection intensity illustrated in FIGS. 10A to 10C.

Although the example in which the color material ink is the K ink is used for the description in this section, the same applies to the color material inks of the other colors. Note that the color deviation correction one-dimensional LUT is generated for each of the color material inks of the respective colors and the reaction liquid corresponding to the color material inks. However, in printing of a non-primary color, the reaction liquid is applied by an amount corresponding to a total of amounts of the reaction liquid for the respective color material inks forming the non-primary color.

Moreover, the color deviation correction one-dimensional LUT is preferably configured to be generated for each of conditions such as the printing medium and the printing resolution. Furthermore, as illustrated in FIG. 14B, the color deviation correction one-dimensional LUT for the reaction liquid specifies only the relationships for inputs up to 0.2. This is because the maximum application amount of the reaction liquid is smaller than that of the color material ink, and the maximum input is 0.2 for the printing medium and the print mode of the present embodiment. The maximum application amount of the reaction liquid varies depending on the printing medium and the print mode to be used, and the input is thus not limited to the above example (is not limited to 0.2).

Moreover, the above-mentioned calibration processing may be executed every time a job instructing the image printing is received, or the correction one-dimensional LUT generated in the previous job execution may be stored in a memory and used. Furthermore, the configuration may be such that the color deviation correction one-dimensional LUT is selected from multiple tables held in advance and set.

Second Embodiment

A second embodiment is described below. Note that configurations of the second embodiment are the same as those of the first embodiment except for the processing of generating the color deviation correction one-dimensional LUT.

In the first embodiment, in the case where there are multiple candidate patches indicating the candidates of the correction values, the ratio $R_{before}$ at a grayscale level that is lower than the grayscale level of interest and at which one correction value candidate patch has been determined is set as the estimation value for obtaining the ratio R at the grayscale level of interest.

However, in the first embodiment, in cases such as the case where multiple correction value candidate patches are present at two or more consecutive grayscale levels, the grayscale level that is prior to the grayscale level of interest and at which $R_{before}$ is referred to is distant from the grayscale level of interest. Accordingly, an error is large in an output of the color deviation correction one-dimensional LUT to be generated. In the present embodiment, in order to reduce the error also in such cases, in the case where multiple candidate patches are present at two or more consecutive grayscale levels, an average value of ratios R at a grayscale level one level lower the grayscale level of interest and ratios R at a grayscale level two levels lower than the grayscale level of interest is set as the estimation value for obtaining the ratio R at the grayscale level of interest.

Figures 15, 15A:
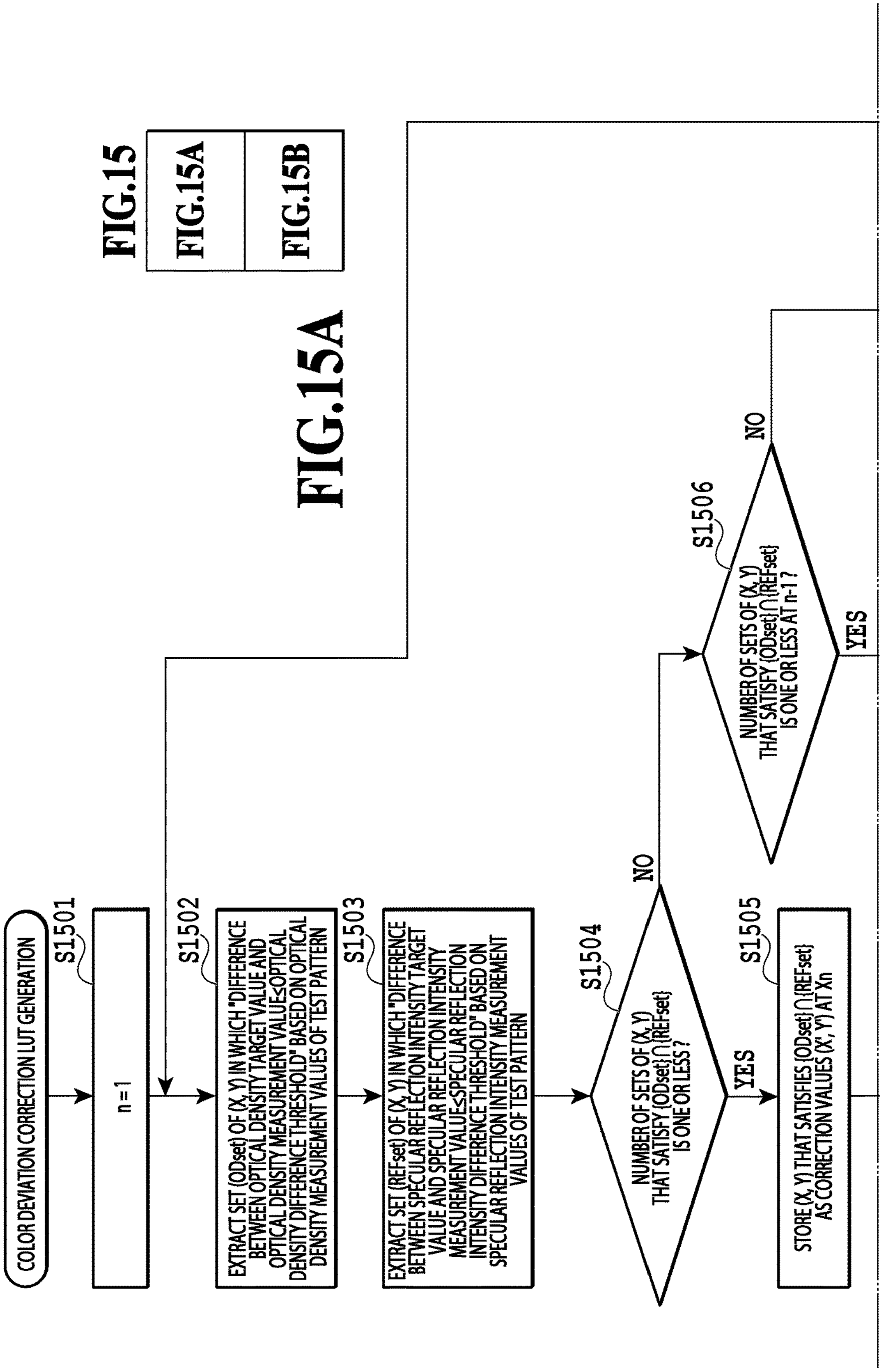
FIG. 15 is a diagram showing the relationship of FIG. 15A and FIG. 15B, and FIGS. 15A and 15B indicate a flowchart of processing of generating the color deviation correction LUT.
Figure 15B:
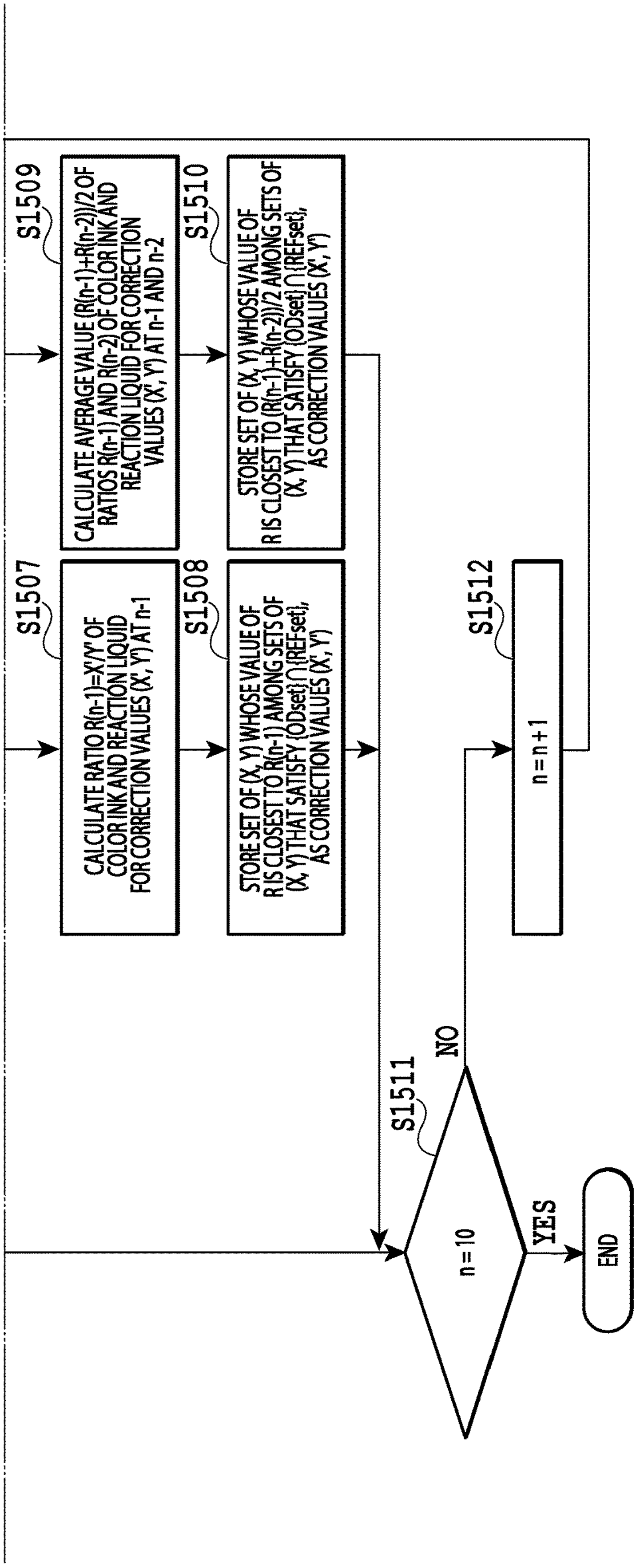

FIGS. 15A and 15B indicate a flowchart illustrating a flow of one-dimensional LUT (for color deviation correction) generation processing according to the present embodiment.

Processes of S1501 to S1505 and S1511 to S1512 are the same as the corresponding processes in the first embodiment (S1101 to S1105 and S1108 to S1109 of FIG. 11A).

The case where a determination result of S1504 is false is described below.

In S1506, the CPU 201 determines whether the number of patches extracted in both of S1502 and S1503 at the gray-scale scale level one level prior to the grayscale level of interest is one or less. In the case where the determination result of the present step is true, the CPU 201 proceeds to S1507. Meanwhile, in the case where the determination result is false, the CPU 201 proceeds to S1509.

In S1507, the CPU 201 calculates a value R(n−1) that corresponds to the patch indicating the correction values at the grayscale level one level prior to the grayscale level of interest and that is obtained by dividing the input value of the color material ink by the input value of the reaction liquid.

In S1508, the CPU 201 calculates the value R obtained by dividing the input value of the color material ink by the input value of the reaction liquid, for each of multiple candidate patches. Then, the CPU 201 specifies a patch corresponding to R closest to R(n−1) calculated in S1507 among the calculated values R. Then, the CPU 201 stores values corresponding to the specified patch as the correction values (X', Y') at Xn.

In S1509, the CPU 201 calculates values that correspond to the respective patches indicating the correction values at the grayscale level one level prior to the grayscale level of interest and that are each obtained by dividing the input value of the color material ink by the input value of the reaction liquid, and obtains an average of these calculated values to calculate R(n−1). Moreover, the CPU 201 calculates values that correspond to the respective patches indicating the correction values at the grayscale level two levels lower than the grayscale level of interest and that are each obtained by dividing the input value of the color material ink by the input value of the reaction liquid, and obtains an average of these calculated values to calculate R(n−2). Then, the estimation value is calculated by using a formula of estimation value=(R(n−1)+R(n−2))/2.

In S1510, the CPU 201 specifies a patch corresponding to R closest to the estimation value calculated in S1509, and sets values indicated by the specified patch as the correction values.

Description is given by using a specific example. In the case where the input of K is 0.8, in S1509, an average value 4.25 that is an average of R=4.20 in the case where the input of K is 0.6 and R=4.29 in the case where the input of K is 0.7 is calculated as the estimation value. Then, in S1501, a patch corresponding to R closest to this estimation value 4.25 is specified, and values indicated by the specified patch are set as the correction values. Specifically, correction values for inputs of targets (color material ink X, reaction liquid Y)=(0.8, 0.16) are (0.7, 0.16). The color deviation correction one-dimensional LUT for all grayscale levels are generated by using the correction values at each grayscale level calculated as described above, and in such generation, a method similar to that in the first embodiment may be used.

Calculating the correction values at each grayscale level by performing the calibration processing of the present embodiment described above enables generation of the color deviation correction one-dimensional LUT with small errors for the targets also in the case where multiple correction value candidate patches are present at consecutive grayscale levels.

Note that, although the estimation value is set to the average value of the ratios R at the two grayscale levels immediately prior to the grayscale level of interest at which the correction values are to be calculated in the present embodiment, the estimation value is not limited to this. For example, an average value or a moving average of ratios R in two or more grayscale levels immediately prior to the grayscale level of interest at which the correction value is to be calculated, R obtained by using polynomial approximation of these values, or the like may be used as the estimation value.

Third Embodiment

A third embodiment is described below.

<Pattern>

Figure 16A:
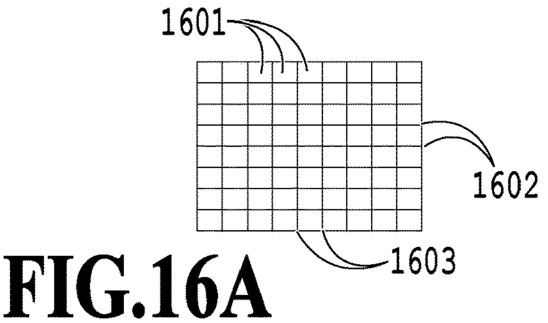
FIGS. 16A to 16D are diagrams for explaining detection of bleed.

FIGS. 16A to 16D are diagrams for explaining patterns (bleed detection patterns) for detecting a state where a bleed phenomenon is occurring (referred to as bleed state), that is determination images used to determine clearness of boundaries in each patch. The patch illustrated in FIG. 16A is a diagram illustrating a patch included in the pattern. In this patch, a first ink color is applied as a background color in each of regions denoted by reference numeral 1601, a second ink color is applied as a fine line color in fine line regions denoted by reference numerals 1602 and 1603, and the reaction liquid is applied over the entire patch.

Figure 16B:
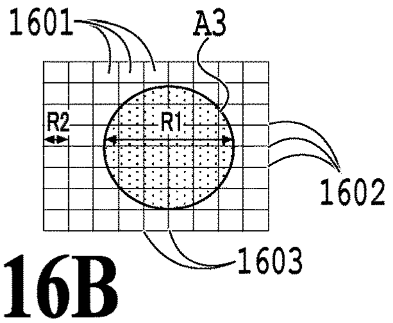

The fine lines that are denoted by reference numeral 1602 and that are substantially parallel to one another are first fine lines (upper side) and second fine lines (lower side), and extend in the horizontal direction. Moreover, the fine lines that are denoted by reference numeral 1603 and that are substantially parallel to one another are third fine lines (left side) and fourth fine lines (right side) having a tilt of 45° or more with respect to the first fine lines, and extend in the vertical direction. As illustrated in FIG. 16B, the fine lines denoted by reference numeral 1602 include at least two or more fine lines, and the fine lines denoted by reference numeral 1603 include at least two or more fine lines.

In the present embodiment, in FIG. 16B, an interval R2 between adjacent fine lines is about 2 mm or smaller, and is half the radius R1 of the irradiation region A3 of the optical sensor or smaller. A uniform output can be thereby obtained in the pattern without an effect of a detection position, and an output change in the optical sensor in the case where the bleed phenomenon occurs is large.

Figure 16C:
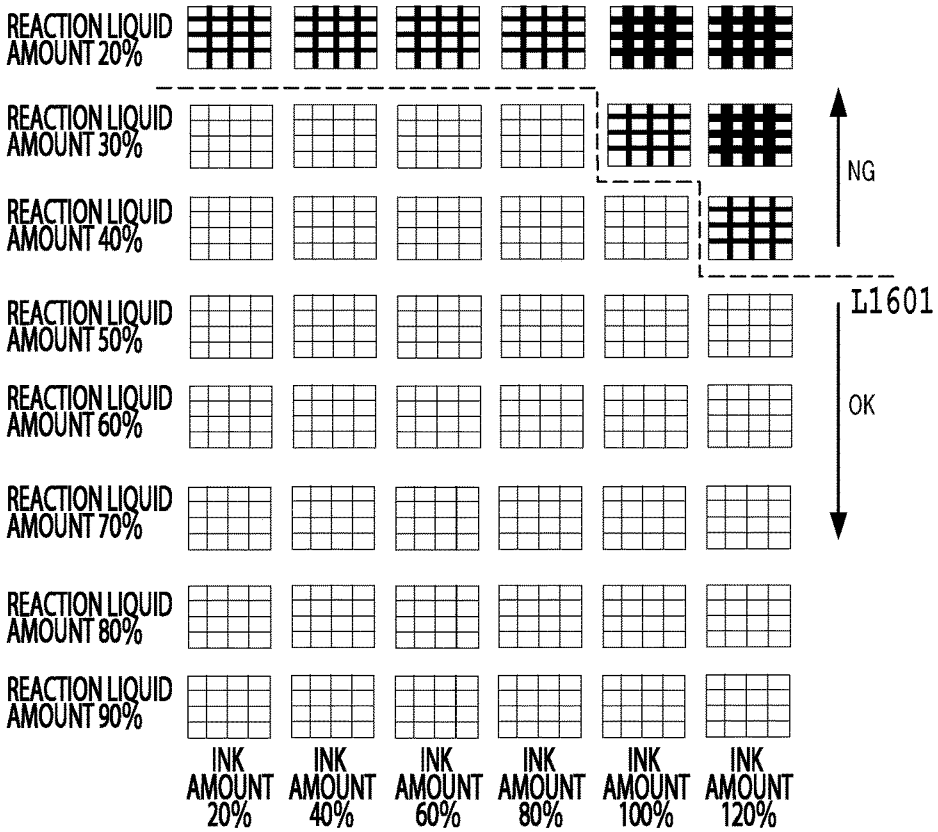

For a combination of predetermined first ink color and second ink color, an application amount of the reaction liquid in which no bleed occurs and that is optimal for an application amount of the inks is obtained by using a pattern as illustrated in FIG. 16C in which multiple patches are arranged, the multiple patches formed by varying each of the application amount of the inks and the application amount of the reaction liquid at predetermined intervals. A boundary L1601 in FIG. 16C is a boundary indicating an optimal state, and a region below the boundary L1601 has no image defect due to bleed, while a region above the boundary L1601 has image defect due to bleed.

Figure 16D:
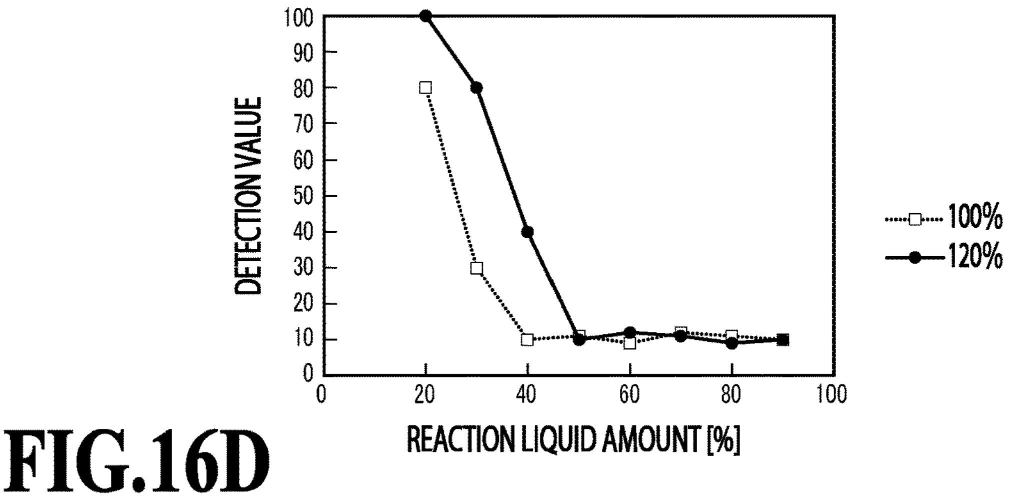

FIG. 16D is a graph illustrating a measured density (detection value) of each patch with respect to the reaction liquid amount in each of the case where the ink amount is 100% and the case where the ink amount is 120%. You can find that the density (detection value) of the patch hardly changes in a range of the reaction liquid amount (reaction liquid amount is substantially 40 to 50% or more) corresponding to a region where no image defect due to bleed occurs, that is the region below the boundary L1601. In both of the case where the ink amount is 100% and the case where the ink amount is 120%, the image defect has occurred in portions where the density (detection value) has changed. In the present embodiment, a reaction liquid amount immediately before a change in the patch density (detection value) by a predetermined amount or more is determined to be an optimal condition that is the minimum reaction liquid amount among the reaction liquid amounts in which no image defect occurs. This determination is performed by the CPU 201.

In the case where there is no point where both of bleed and granularity are satisfied, b=E is set in S1820 (FIG. 18B) to be described later. This is because the main intention of the reaction liquid according to the present embodiment is prevention of bleed on the printing medium.

Moreover, a pattern as illustrated in FIG. 10A used in the first embodiment is used as a pattern for detecting granularity (granularity detection pattern), in other words, a determination image used to determine granularity in each patch. Patches sequentially varied in the density of the ink and the density of the reaction liquid are arranged, and are used for the determination of granularity.

In the present embodiment, the measurement result of the bleed detection pattern and the measurement result of the granularity detection pattern are selectively used depending on the ink application amount.

Figure 17A:
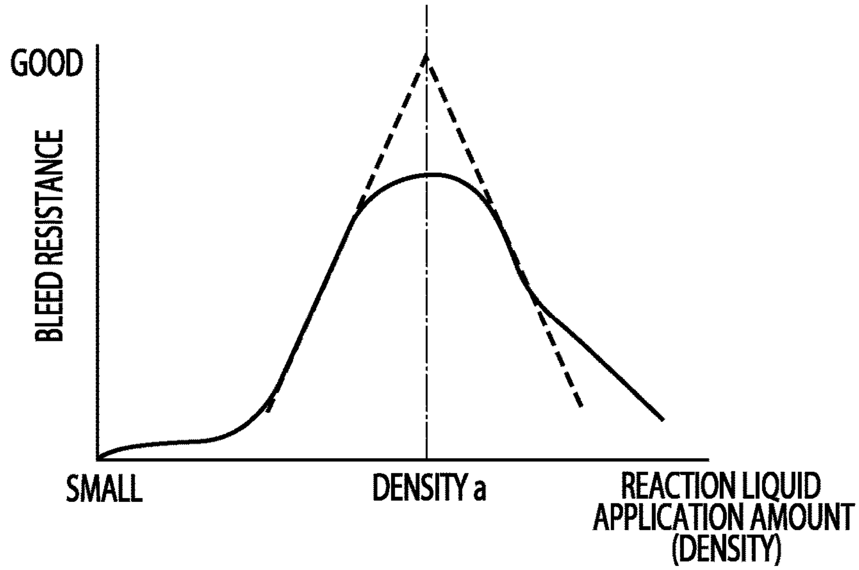
FIGS. 17A to 17C are diagrams for explaining a determination method of a density (application amount of the reaction liquid)
Figure 17B:
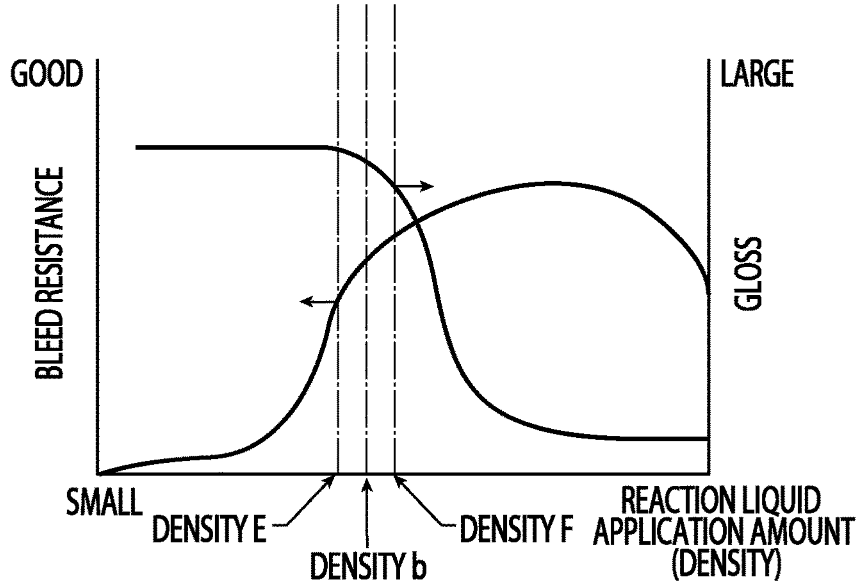
Figure 17C:
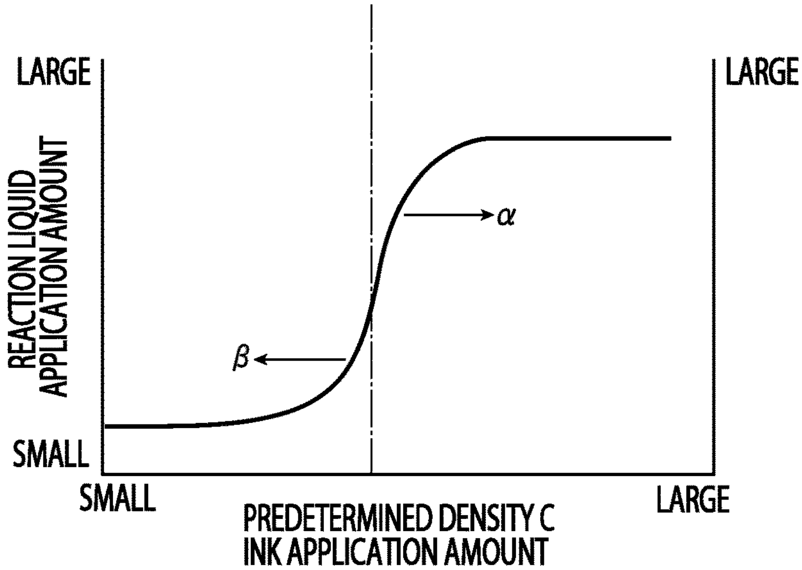

FIGS. 17A to 17C illustrate examples of results of determination of the reacting liquid application amount performed by using the method according to the present embodiment.

As illustrated in FIG. 17A, in a general image, bleed resistance increases as the reaction liquid application amount increases. Meanwhile, in the case where the reaction liquid is excessively supplied, flowability is maintained also after the reaction due to the excessive reaction liquid, and the bleed resistance thus conversely decreases in some cases. In a printing medium with poor wetting and spreading properties, the reaction liquid amount is larger than that in a printing medium with good wettability, and bleed thus occurs more noticeably. Accordingly, in order to obtain an image with optimized bleed resistance, the reaction liquid application amount needs to be suppressed not to be excessive.

<Determination Unit>

In FIG. 17C, a density C of the ink application amount determined by using a printed patch-shaped determination image is set as a boundary, and in a region (referred to as region B) where the ink application amount is equal to or smaller than a predetermined value (specifically, equal to or lower than the density C), the reaction liquid application amount is determined based on the granularity detection pattern. Meanwhile, in a region (referred to as region a) where the ink application amount is equal to or larger than the predetermined value (specifically, equal to or higher than the density C), the reaction liquid application amount is determined based on the bleed detection pattern.

Processing of determining the application amount according to the present embodiment is described below by using FIGS. 18A and 18B.

In S1800, the CPU 201 of the printing apparatus 100 determines the type of the set printing medium.

In S1801, the CPU 201 prints the bleed detection pattern. Note that a printing operation of the present step is assumed to include a necessary fixation operation after the printing.

After the completion of fixation, in S1802, the CPU 201 reads the pattern printed in S1801.

In S1803, the CPU 201 prints the granularity detection pattern. Note that a printing operation of the present step is assumed to include a necessary fixation operation after the printing.

After the completion of fixation, in S1804, the CPU 201 reads the pattern printed in S1803.

In S1805, the CPU 201 performs determination processing for determining a density b of the boundary. Note that the determination processing of the present step is described later (described by using FIG. 18B).

In S1806, the CPU 201 determines whether the density b is determined in S1805. In the case where the determination result of the present step is true, the CPU 201 terminates the series of processes. Meanwhile, in the case where the determination result is false, the CPU 201 proceeds to S1807.

In S1807, the CPU 201 sets a provisional value prepared in advance as the density b. Data of the provisional value used in the present step is stored in advance in the ROM 202 of the printing apparatus 100.

Figure 18A:
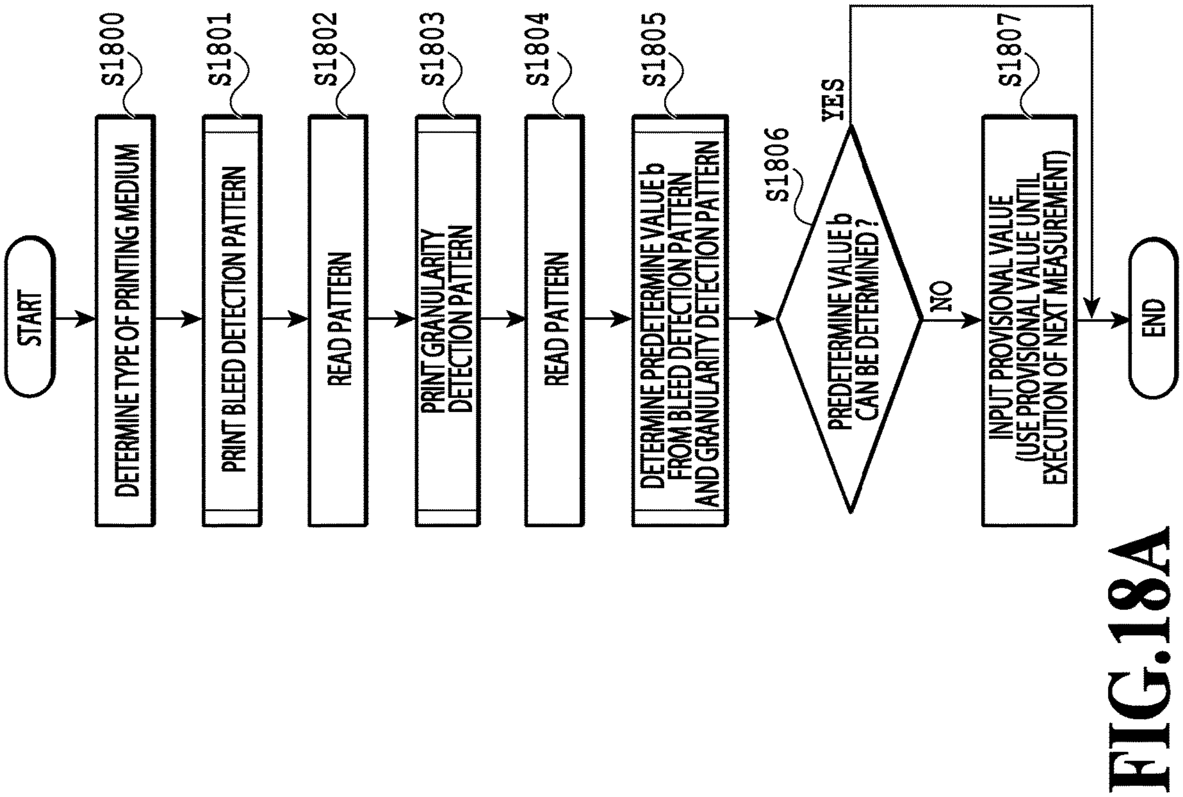
FIGS. 18A to 18B are flowcharts of processing of determining the application amount of the reaction liquid.
Figure 18B:
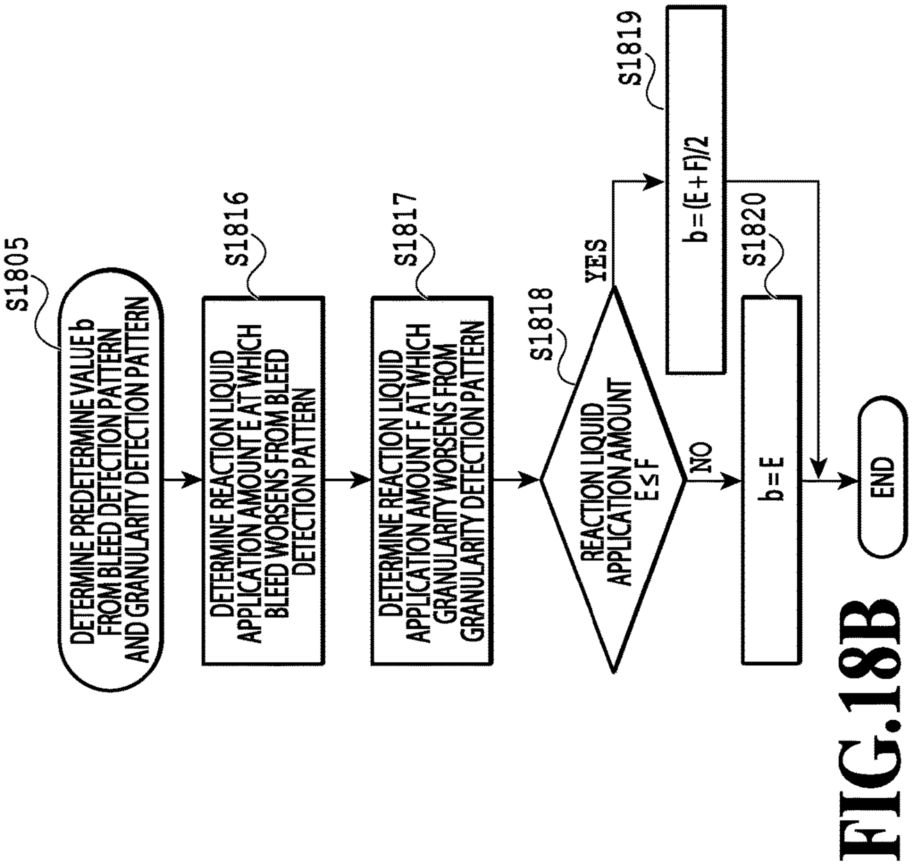

S1805 of FIG. 18A is described by using FIGS. 17B and 18B.

In S1816, the CPU 201 identifies a point where the bleed resistance decreases, from the read result of the bleed detection pattern, and determines a density E (reaction liquid application amount E) of the reaction liquid at the identified point.

In S1817, the CPU 201 identifies a point where the granularity decreases (degrades) from the read result of the granularity detection pattern, and determines a density F (reaction liquid application amount F) of the reaction liquid at the identified point.

In S1818, the CPU 201 determines whether a region where the suppression of the decrease in the bleed resistance and the suppression of the decrease in granularity are both achieved is present. Specifically, the CPU 201 determines whether E≤F is satisfied. In the case where the determination result of the present step is true, the CPU 201 proceeds to S1819. Meanwhile, in the case where the determination result of the present step is false, the CPU 201 proceeds to S1820.

In S1819, the CPU 201 calculates the density b (reaction liquid application amount b) by using a formula of b=(E+F)/2.

In S1820, the CPU 201 calculates the density b by using a formula of b=E.

In the case where there is no point where the bleed and the granularity are both satisfied, in S1820 (FIG. 18B), the CPU 201 sets b=E. This is because the main intention of the reaction liquid according to the present embodiment is prevention of bleed on the printing medium.

The present embodiment requires reading of the printed determination images and feed-back of the read results to a control unit. As a unit for such reading, a printing apparatus main body may include a measurement device for evaluating the granularity and a measurement device for measuring the bleed, and be configured to automatically perform the processing. However, in the case where the main body has such a configuration, in actual, the printing apparatus is excessively large. Accordingly, the configuration is generally such that these determinations are performed by an external measurement apparatus or performed visually by the user, and the results of the determinations are fed back to the control unit in the main body through a panel or from an external apparatus such as a host. This configuration is assumed to be superior in terms of cost, size, and the like. As a method of evaluating the granularity, for example, Graininess (complying with ISO 13660) is used as an evaluation scale for granularity of a solid image. Moreover, Scotchcal Graphical Film IJ1220N (gloss finish, 3M Japan Limited) that is an inkjet printing medium for outdoor sign application is used as the printing medium. Note that, although an image scanner (ES-2200) manufactured by Epson Corporation is used for the measurement of Graininess, the measurement device is not limited to this as long as the measurement device can measure Graininess.

Fourth Embodiment

A fourth embodiment is described below. In recent years, cases where a clear ink is used to improve decorativeness and gloss of a finished product are increasing. In the case where the clear ink is used, a technique of stopping flow of the clear ink by using the reaction liquid as for the general color material ink is used as in the above-mentioned third embodiment. Accordingly, also in the case of the clear ink, an application amount of the reaction liquid optimal for an application amount of the clear ink needs to be obtained as in the case of the color material ink.

Figure 19A:
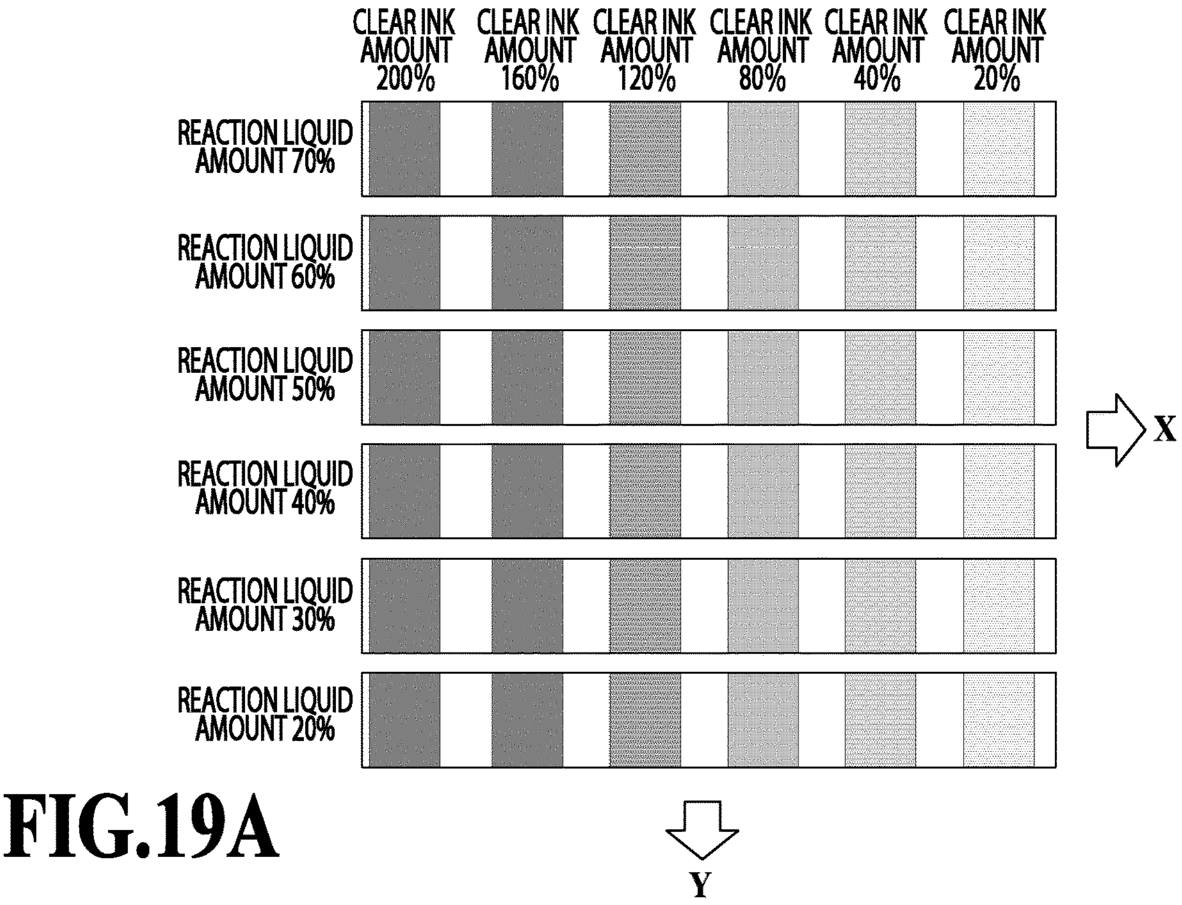
FIGS. 19A and 19B are charts in which patches are two-dimensionally arranged.

In the case where only the reaction liquid and the clear ink are to be applied to a medium being the base, as illustrated in FIG. 19A, there is created a test pattern of a chart formed of patches that are two-dimensionally arranged and that are varied in the application amount of the reaction liquid and the application amount of the clear ink, as in the third embodiment. This enables selection of the reaction liquid application amount at which the gloss is highest among the reaction liquid application amounts for the same clear ink amount, and enables determination of the optimal value of the reaction liquid for each clear ink application amount. In FIG. 19A, the patches of the clear ink are each given a certain shade depending on the clear ink application amount for the sake of explanation. However, the clear ink itself is transparent, and the application amount thereof cannot be visually recognized as a shade in actual.

Figure 19B:
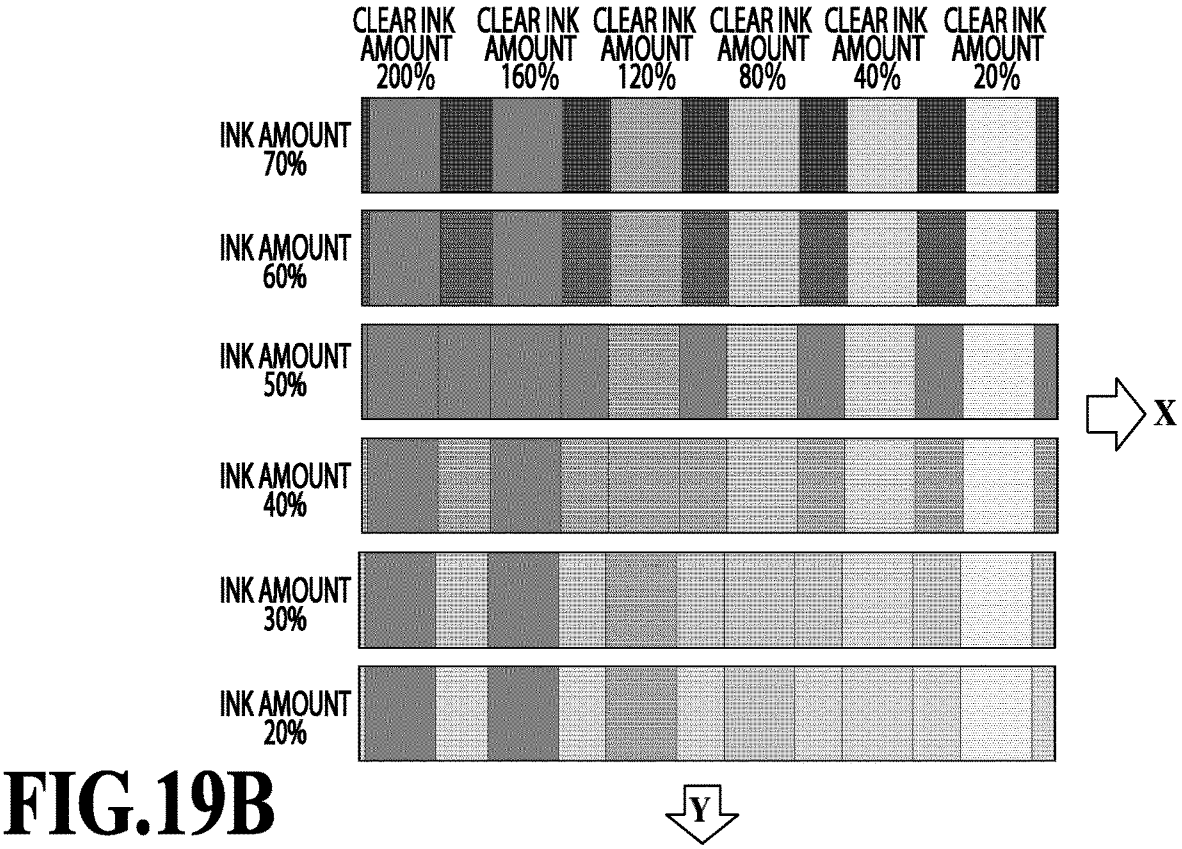

In the present embodiment, since there is a possibility of a three-component system, the optimal application amount needs to be obtained for each of the reaction liquid, the color material ink, and the clear ink. FIG. 19B illustrates one example of a test chart including a collection of patches varying in the application amount of the clear ink and the application amount of the color material ink at a predetermined reaction liquid application amount.

In FIG. 19B, the patches varying in the application amount of the clear are arranged in the scanning direction (X direction) of the carriage, and the patches varying in the application amount of the ink are arranged in the conveyance direction (Y direction) of the printing medium. In this chart, the application amount of the reaction liquid is uniform. Regarding the density of the reaction liquid, different patches printed by changing the density of the reaction liquid are used to verify sensitivity to the density of the reaction liquid. The same printing medium and color material inks as those in the above-mentioned embodiments may be used.

Figure 20A:
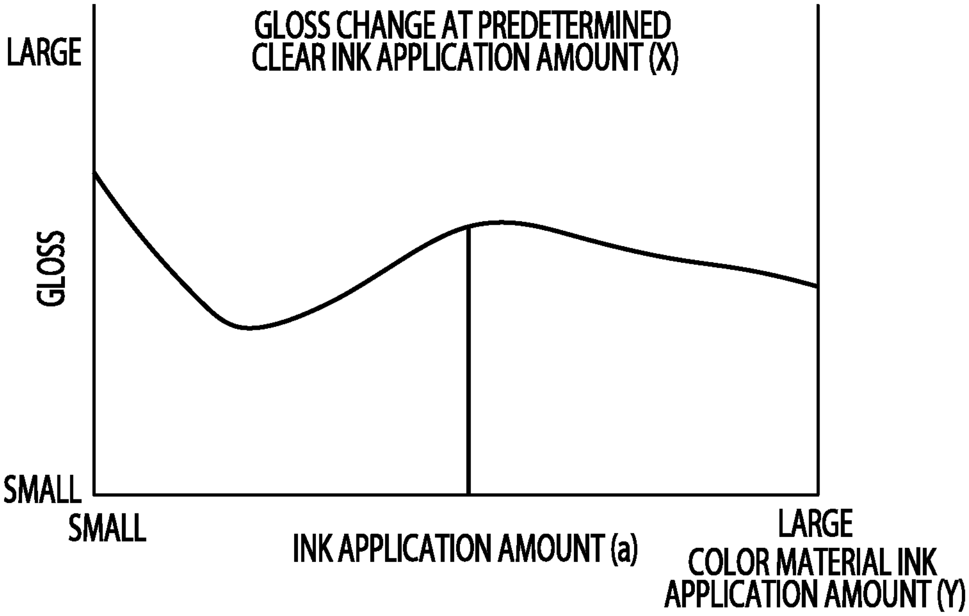
FIGS. 20A and 20B are relationships between gloss and an application amount of a color material ink.

FIG. 20A is a graph illustrating a relationship between the ink application amount and the gloss obtained by reading the chart illustrated in FIG. 19B. With reference to FIG. 20A, the gloss decreases as the color material ink application amount (Y) increases from 0. This is because the color material ink of a small application amount forms unevenness of the color material ink on a surface and does not become flat, and the unevenness remains on the surface even in the case where the clear ink is applied. Then, the unevenness of the color material ink is eliminated with an increase in the color material ink application amount (Y), and as a result, the gloss increases. The gloss increases up to a point corresponding to a color material ink application amount (a). Then, the action of the solidifying the color material ink by the reaction liquid becomes insufficient, and unevenness is formed again by advection of the color material ink. As a result, the gloss decreases.

In order to correct the trouble of the gloss varying with respect to the color material ink application amount as described above, as illustrated in FIG. 19B, the application amount of the reaction liquid needs to be adjusted. For such adjustment, the test pattern in which the application amount of the clear ink and the application amount of the color material ink are varied on a matrix is printed for application of a predetermined amount of the reaction liquid. This test pattern is created for each reaction liquid application amount, and a gloss value for each combination of the application amount of the color material ink and the application amount of the clear ink corresponding to each reaction liquid application amount is stored in the RAM 203. Such a process enables generation of a map in which an input is three-dimensional, that is a three-dimensional map expressing a gloss value for each combination of the application amounts of the reaction liquid, the color material ink, and the clear ink.

Figure 20B:
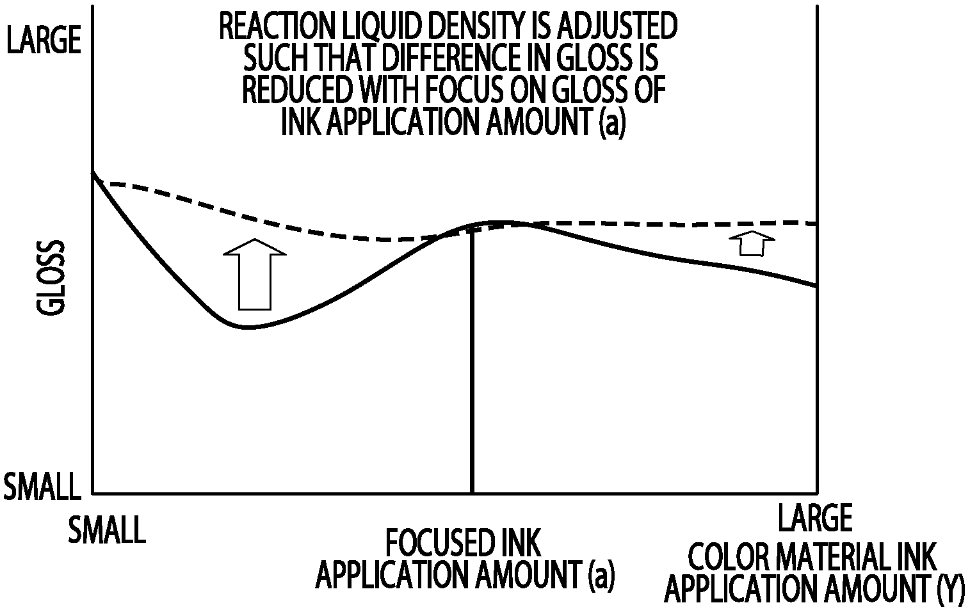

With reference to FIG. 20A, portions where the gloss decreases are present on both sides of the color material inks application amount (a) corresponding to the point where the gloss reaches its peak, the both sides being the side where the application amount of the color material ink is large and the side where the application amount of the color material ink is small. FIG. 20B illustrates an example in which the application amount of the reaction liquid is adjusted for these portions to suppress the gloss change. In the present embodiment, the application amount of the reaction liquid is outputted for each combination of the ink application amount and the clear ink application amount as described above. Accordingly, the gloss change can be suppressed by determining the application amount of the color material ink and the application amount of the clear ink and then selecting the application amount of the reaction liquid at which the gloss is highest.

Figure 21A:
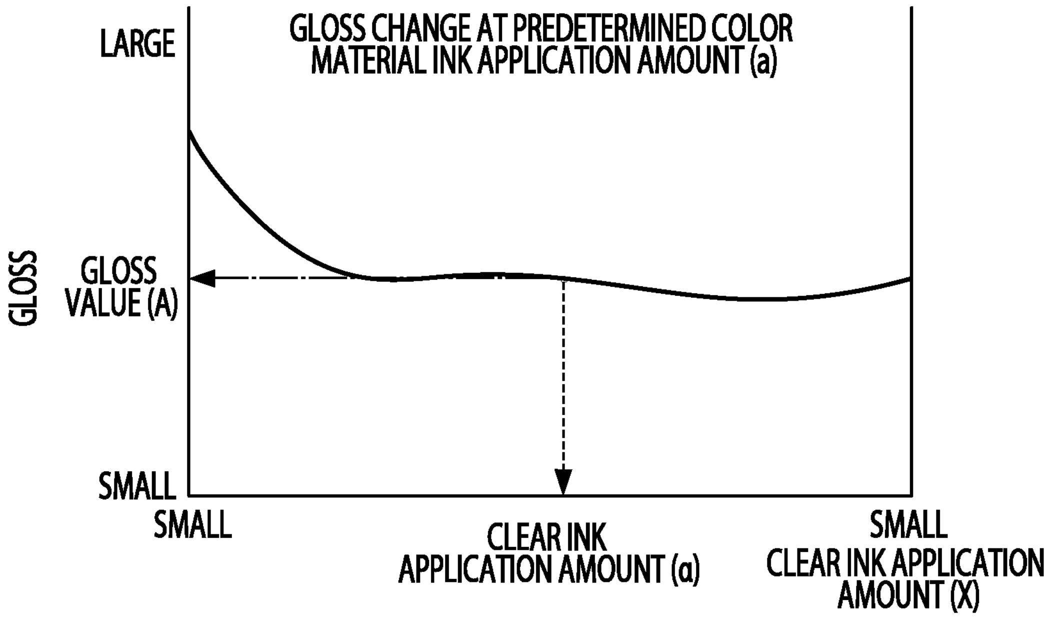
FIGS. 21A and 21B are relationships between gloss and an application amount of a clear ink.
Figure 21B:
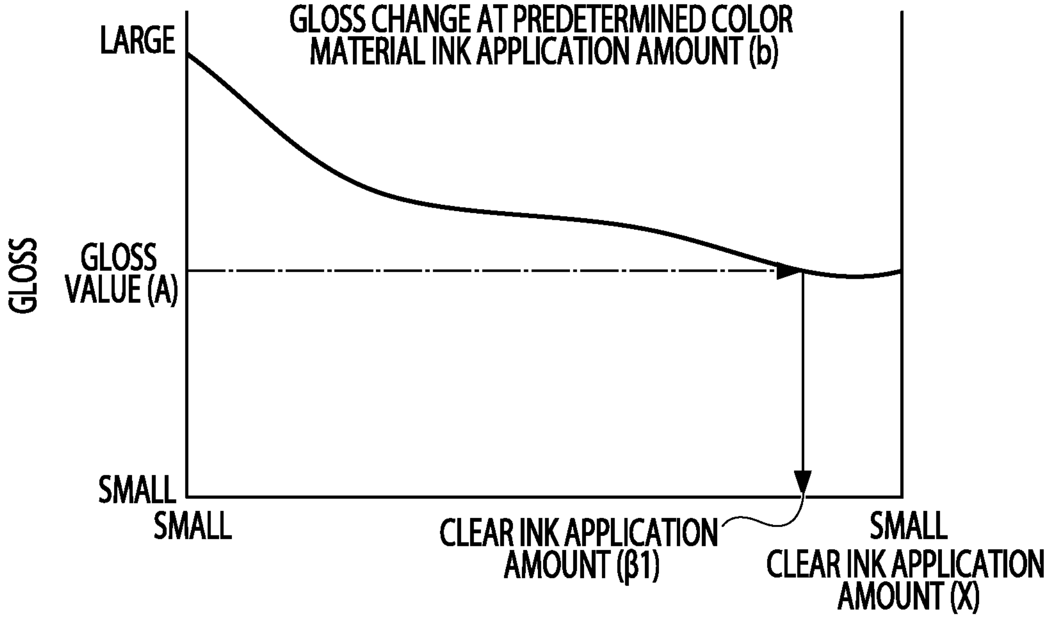

FIG. 21A illustrates a case where the gloss value is adjusted by adjusting the application amount of the reaction liquid and the application amount of the clear ink in the case where the predetermined color material ink application amount is necessary. The case of FIG. 21A is a case where the gloss value hardly changes with respect to the application amount of the clear ink. In the case where a color material and a resin particle in the color material ink affect the gloss, such a case may occur. In such a case, focus is given to a gloss value (A) corresponding to a predetermined clear ink application amount (a). Then, as illustrated in FIG.

21B, a clear ink application amount (ß1) indicating a gloss value closest to the gloss value (A) in each reaction liquid application amount is selected. Adjustment can be thereby performed to maintain uniform glossiness.

As described above, the variation in the gloss can be suppressed as much as possible by adjusting the application amount of each of the color material ink, the clear ink, and the reaction liquid. However, since a desired amount of the color material ink basically needs to be applied, the gloss change is suppressed by adjusting the application amount of the reaction liquid and the application amount of the clear ink in the end.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to achieve application amount correction in which a printing result can be adjusted to an optical density target value and a gloss target value in the case where a reaction liquid and an ink containing a color material are applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-203719, filed Dec. 20, 2022, which is hereby incorporated by reference wherein in its entirety.

What is claimed is:

1. A printing apparatus comprising:

a printing unit configured to eject a color material ink and a reaction liquid containing a component that reacts with a color material contained in the color material ink;

a controller configured to control the printing unit such that the printing unit prints a first test pattern in which a plurality of patches are arranged, the plurality of patches each printed by applying the color material ink and the reaction liquid ejected from the printing unit to an identical area, the plurality of patches varying from one another in an application amount of the color material ink and an application amount of the reaction liquid to each patch;

a first obtaining unit configured to obtain an optical density for each of the plurality of patches;

a second obtaining unit configured to obtain a specular reflection intensity for each of the plurality of patches; and a first generation unit configured to generate correction information based on the optical density obtained by the first obtaining unit, the specular reflection intensity obtained by the second obtaining unit, a first target value of the optical density for a first input value of the color material ink, and a second target value of the specular reflection intensity for a second input value of the reaction liquid, the correction information being information in which a combination of a first correction value used for correction of the application amount of the color material ink and a second correction value used for correction of the application amount of the reaction liquid is held.

2. The printing apparatus according to claim 1, further comprising:

a first determination unit configured to determine whether or not a difference between the optical density obtained by the first obtaining unit and the first target value is equal to or smaller than a predetermined threshold for each of the plurality of patches; and a second determination unit configured to determine whether or not a difference between the specular reflection intensity obtained by the second obtaining unit and the second target value is equal to or smaller than a predetermined threshold for each of the plurality of patches.

3. The printing apparatus according to claim 2, wherein a candidate of the combination of the first correction value and the second correction value is determined based on a determination result of the first determination unit and a determination result of the second determination unit.

4. The printing apparatus according to claim 3, wherein, in a case where the candidate determined at a grayscale level of interest is a plurality of candidates and the candidate determined at a grayscale level one level prior to the grayscale level of interest is one candidate, the first generation unit (1) calculates a first ratio by dividing the first input value by the second input value for each of the plurality of candidates at the grayscale level of interest, and (2) calculates a second ratio by dividing the first input value by the second input value for the one candidate at the grayscale level one level prior to the grayscale level of interest.

5. The printing apparatus according to claim 4, wherein the first generation unit determines one candidate from among the plurality of candidates at the grayscale level of interest based on the first ratio calculated for each of the plurality of candidates and the second ratio calculated for the one candidate at the grayscale level one level prior to the grayscale level of interest.

6. The printing apparatus according to claim 5, wherein the first generation unit determines a candidate in which the first ratio is closest to the second ratio as the one candidate from among the plurality of candidates at the grayscale level of interest.

7. The printing apparatus according to claim 4, wherein the first input value at the grayscale level of interest is larger than the first input value at the grayscale level one level prior to the grayscale level of interest, and wherein the second input value at the grayscale level of interest is larger than the second input value at the grayscale level one level prior to the grayscale level of interest.

8. The printing apparatus according to claim 3, wherein, in a case where the candidate determined at a grayscale level of interest is a plurality of candidates and the candidate determined at a grayscale level one level prior to the grayscale level of interest is a plurality of candidates, the first generation unit (1) calculates a first ratio by dividing the first input value by the second input value for each of the plurality of candidates at the grayscale level of interest, and (2) calculates an estimation value by obtaining an average of a ratio obtained by dividing the first input value by the second input value for each of the plurality of candidates at the grayscale level one level prior to the grayscale level of interest and a ratio obtained by dividing the first input value by the second input value for each of a plurality of candidates at a grayscale level two levels prior to the grayscale level of interest.

9. The printing apparatus according to claim 8, wherein the first generation unit determines one candidate from among the plurality of candidates at the grayscale level of interest based on the estimation value and the first ratio calculated for each of the plurality of candidates at the grayscale level of interest.

10. The printing apparatus according to claim 9, wherein the first generation unit determines a candidate in which the first ratio is closest to the estimation value as the one candidate from among the plurality of candidates at the grayscale level of interest.

11. The printing apparatus according to claim 10, wherein the first input value increases as the grayscale level steps up from the grayscale level two levels prior to the grayscale level of interest to the grayscale level one level prior to the grayscale level of interest, and then to the grayscale level of interest, and wherein the second input value increases as the grayscale level steps up from the grayscale level two levels prior to the grayscale level of interest to the grayscale level one level prior to the grayscale level of interest, and then to the grayscale level of interest.

12. The printing apparatus according to claim 1, further comprising a fixing unit configured to fix the color material ink and the reaction liquid ejected from the printing unit and applied to a printing medium, wherein a first pattern including a plurality of patches used to determine clearness of boundaries is printed to detect a bleed state, and wherein a second pattern including a plurality of patches used to determine granularity is printed to detect granularity.

13. The printing apparatus according to claim 12, wherein in a case where the application amount of the color material ink is equal to or more than a predetermined value, the application amount of the reaction liquid is determined based on a read result of the first pattern, and wherein in a case where the application amount of the color material ink is equal to or less than the predetermined value, the application amount of the reaction liquid is determined based on a read result of the second pattern.

14. The printing apparatus according to claim 13, further comprising:

a first decision unit configured to decide an application amount E of the reaction liquid corresponding to a point where bleed resistance decreases, based on the read result of the first pattern;

a second decision unit configured to decide an application amount F of the reaction liquid corresponding to a point where granularity decreases, based on the read result of the second pattern;

a determination unit configured to determine whether $E \leq F$ is satisfied; and a calculation unit configured to calculate an application amount b of the reaction liquid based on a determination result of the determination unit.

15. The printing apparatus according to claim 14, wherein the calculation unit calculates the application amount b of the reaction liquid according to $b=(E+F)/2$ in a case where the determination result of the determination unit is true, and calculates the application amount b of the reaction liquid according to $b=E$ in a case where the determination result of the determination unit is false.

16. The printing apparatus according to claim 1, wherein a clear ink is further ejected from the printing unit, and wherein the printing unit (1) prints a second test pattern in which a plurality of patches are arranged, the plurality of patches each printed by applying the clear ink and the reaction liquid ejected from the printing unit to an identical area, the plurality of patches varying from one another in an application amount of the clear ink and an application amount of the reaction liquid to each patch, and (2) prints a third test pattern in which a plurality of patches are arranged, the plurality of patches each printed by applying the clear ink and the color material ink ejected from the printing unit to an identical area, the plurality of patches varying from one another in an application amount of the clear ink and an application amount of the color material ink to each patch.

17. The printing apparatus according to claim 16, further comprising a second generation unit configured to generate a map defining a gloss value corresponding to each of combinations of the application amounts of the reaction liquid, the color material ink, and the clear ink, based on read results of the first test pattern, the second test pattern, and the third test pattern.

18. The printing apparatus according to claim 17, wherein the application amount of the color material ink and the application amount of the clear ink are determined, and then the application amount of the reaction liquid at which gloss is the highest is selected.

19. The printing apparatus according to claim 18, wherein a gloss change is suppressed.

20. The printing apparatus according to claim 1, wherein the color material ink contains a pigment as the color material, and wherein the reaction liquid contains no color material, and contains a content that causes the pigment to aggregate.

21. The printing apparatus according to claim 1, wherein the correction information holds information on a combination of the first input value and the second input value and the combination of the first correction value and the second correction value.

22. The printing apparatus according to claim 1, wherein the correction information is used in color deviation correction processing.

23. The printing apparatus according to claim 1, wherein, regarding a transfer amount of a water-soluble ink to a printing medium measured by a Bristow method, a transfer amount in a transfer time of one second is 20 $ml/m^2$ or less.

24. A control method of a printing apparatus including a printing unit configured to eject a color material ink and a reaction liquid containing a component that reacts with a color material contained in the color material ink and a controller configured to control the printing unit such that the printing unit prints a first test pattern in which a plurality of patches are arranged, the plurality of patches each printed by applying the color material ink and the reaction liquid ejected from the printing unit to an identical area, the plurality of patches varying from one another in an application amount of the color material ink and an application amount of the reaction liquid to each patch, the control method comprising:

a first obtaining step of obtaining an optical density for each of the plurality of patches;

a second obtaining step of obtaining a specular reflection intensity for each of the plurality of patches; and a step of generating correction information based on the optical density obtained in the first obtaining step, the specular reflection intensity obtained in the second obtaining step, a first target value of the optical density for a first input value of the color material ink, and a second target value of the specular reflection intensity for a second input value of the reaction liquid, the correction information being information in which a combination of a first correction value used for correction of the application amount of the color material ink and a second correction value used for correction of the application amount of the reaction liquid is held.

25. A non-transitory computer-readable storage medium storing a program that causes a computer to execute a control method of a printing apparatus including a printing unit configured to eject a color material ink and a reaction liquid containing a component that reacts with a color material contained in the color material ink and a controller configured to control the printing unit such that the printing unit prints a first test pattern in which a plurality of patches are arranged, the plurality of patches each printed by applying the color material ink and the reaction liquid ejected from the printing unit to an identical area, the plurality of patches varying from one another in an application amount of the color material ink and an application amount of the reaction liquid to each patch, the control method comprising:

a first obtaining step of obtaining an optical density for each of the plurality of patches;

a second obtaining step of obtaining a specular reflection intensity for each of the plurality of patches; and a step of generating correction information based on the optical density obtained in the first obtaining step, the specular reflection intensity obtained in the second obtaining step, a first target value of the optical density for a first input value of the color material ink, and a second target value of the specular reflection intensity for a second input value of the reaction liquid, the correction information being information in which a combination of a first correction value used for correction of the application amount of the color material ink and a second correction value used for correction of the application amount of the reaction liquid is held.

* * * * *